United States Patent [19]
Ezawa et al.

[11] Patent Number: 5,142,657
[45] Date of Patent: Aug. 25, 1992

[54] APPARATUS FOR DRILLING PRONUNCIATION

[75] Inventors: Sadaaki Ezawa; Ryoichi Endoh; Katsuhiro Hashimoto; Michiko Nihei, all of Hamamatsu, Japan

[73] Assignee: Kabushiki Kaisha Kawai Gakki Seisakusho, Shizuoka, Japan

[21] Appl. No.: 735,108

[22] Filed: Jul. 23, 1991

Related U.S. Application Data

[63] Continuation of Ser. No. 323,435, Mar. 14, 1989, abandoned.

[30] Foreign Application Priority Data

Mar. 14, 1988 [JP] Japan .................... 63-58267

[51] Int. Cl.⁵ .............................. G10L 5/00
[52] U.S. Cl. .................................. 381/48
[58] Field of Search ................... 381/36-45, 381/48-50; 395/2; 433/112, 167, 169, 176, 185

[56] References Cited

U.S. PATENT DOCUMENTS

| | | | |
|---|---|---|---|
| 3,881,059 | 4/1975 | Stewart | 381/48 |
| 4,063,035 | 12/1977 | Appelman et al. | 381/48 |
| 4,335,276 | 6/1982 | Bull et al. | 381/48 |
| 4,426,551 | 2/1984 | Komatsu et al. | 381/41 |
| 4,580,133 | 4/1986 | Matsuoka et al. | 381/48 |
| 4,627,091 | 12/1986 | Fedele | 381/46 |
| 4,641,343 | 2/1987 | Holland et al. | 381/48 |

OTHER PUBLICATIONS

Japanese Unexamined Patent Pub. No. Sho 62-2286 Jan. 8, 1987.
Japanese Unexamined Patent Pub. No. SHO 58-172680 Oct. 11, 1983.

*Primary Examiner*—Dale M. Shaw
*Assistant Examiner*—Michelle Doerrler
*Attorney, Agent, or Firm*—Michael N. Meller

[57] ABSTRACT

An apparatus for drilling pronunciation has a voice analyzer for analyzing voice signals produced by a speaker during pronunciation, a memory for storing at least the result of the voice analysis, and a display for displaying at least the result of the voice analysis. The apparatus further includes a plurality of keys, each of the keys being operable by a user, and circuitry for controlling two screen constitutions independently of each other on the display in response to manipulation of the keys whereby the screen constitutions display the result of the voice analysis in a comparative manner.

3 Claims, 22 Drawing Sheets

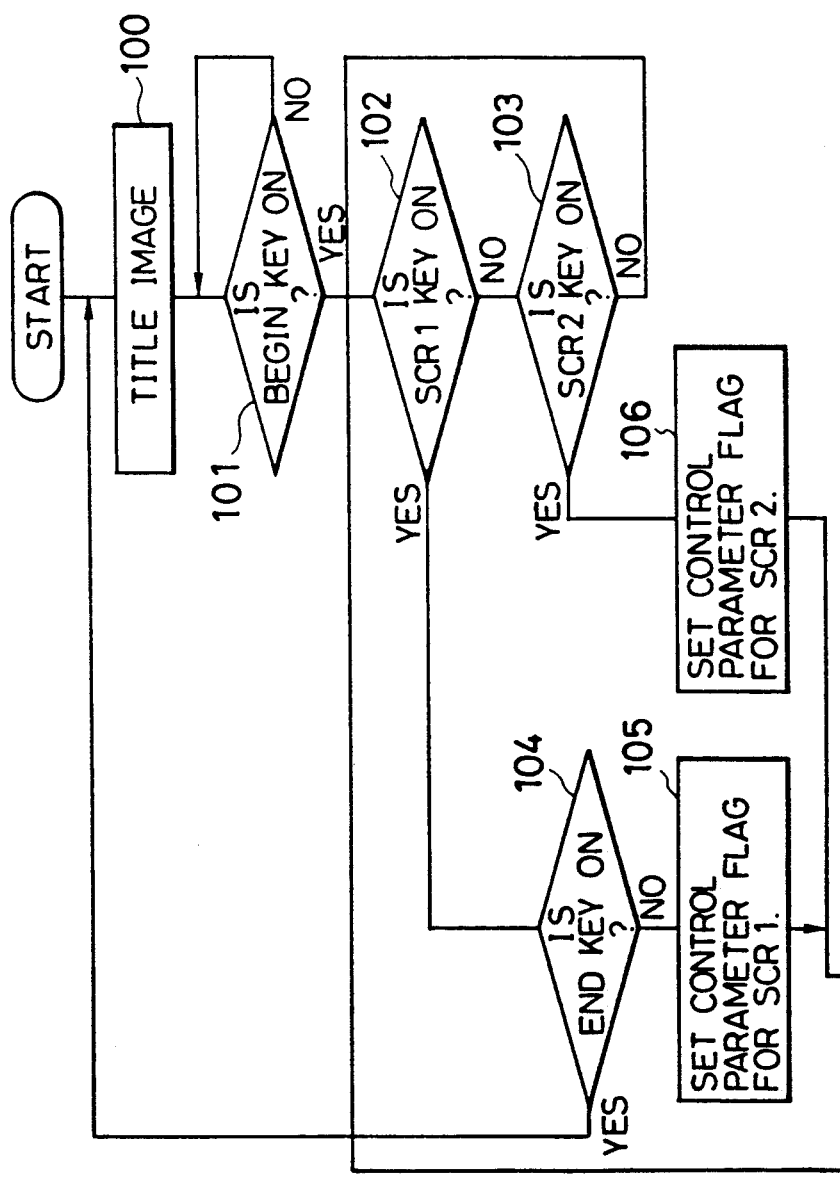

FIG. 15
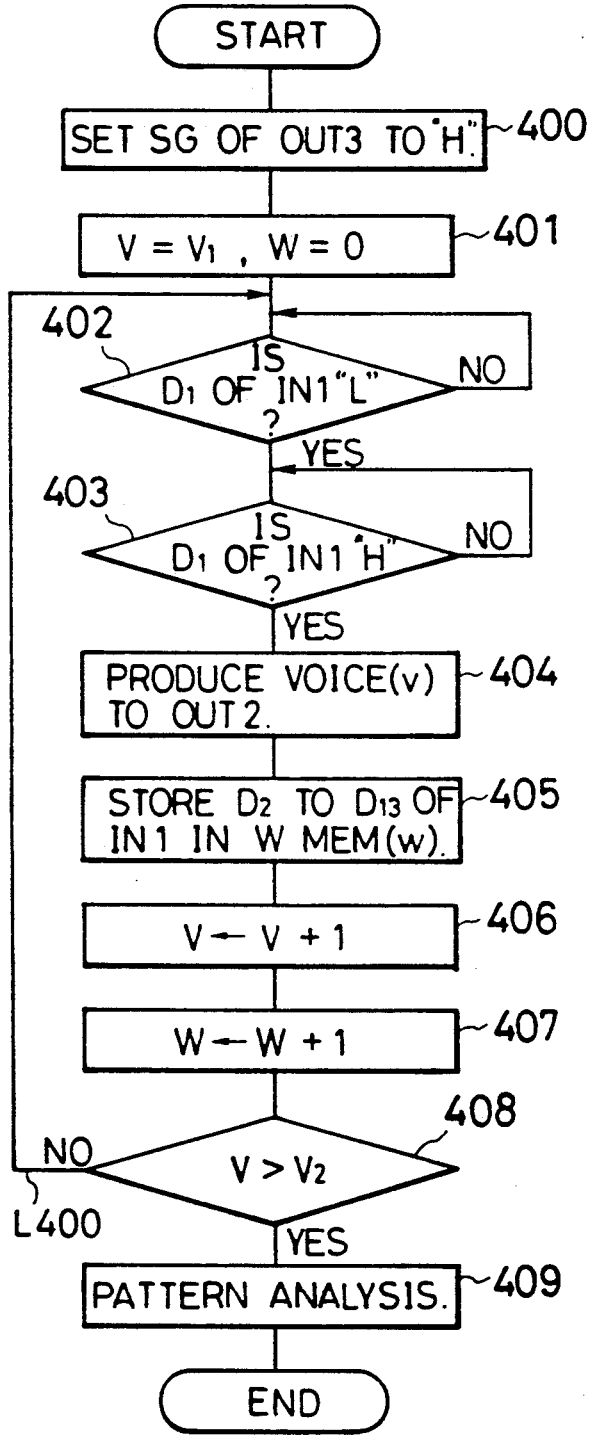
FIG. 16
GRADATION NUMBER
7 
6 
5 
4 
3 
2 
1 

5,142,657

APPARATUS FOR DRILLING PRONUNCIATION

This application is a continuation of application Ser. No. 323,435, filed Mar. 14, 1989 now abandoned.

FIELD OF THE INVENTION

The present invention relates to an apparatus for drilling a speaker to teach correct pronunciation which can be used for effectively teaching pronunciation in speech, for example, in English, by applying the technology of voice analysis.

BACKGROUND OF THE INVENTION

Drilling for the purpose of teaching the correct pronunciation of foreign languages has heretofore been carried out by having a native speaker of a foreign language evaluate the pronunciation of the student, or by a self-training method using cassette tapes, video tapes or disk records that are commercially marketed.

A native speaker of a foreign language who evaluates the student's pronunciation will find it very difficult to have the student perceive subtle differences in pronunciation. Using cassette tapes and video tapes, on the other hand, the student has no means for ensuring that his pronunciation is correct, i.e., the student must evaluate his pronunciation by relying upon his own sense of hearing.

The present applicant, therefore, has previously proposed an apparatus for teaching correct pronunciation such as stress, accent, intonation, vowels and consonants (see Japanese Patent Application No. 303772/1986) by analyzing the voicing that accompanies the student's pronunciation, displaying voice parameters such as waveforms, power, pitch (high and low of sound) and sound spectrograph obtained as a result of analysis, comparing the pronunciation data measured from the pattern of voice parameters with the model pronunciation data, and offering correction commentary based on the result of the comparison, so that the student may efficiently acquire the standard voice pattern of the teacher.

SUMMARY OF THE INVENTION

The present invention is concerned with improvements in the apparatus for teaching a speaker to pronounce and its object is to provide an apparatus for efficiently drilling the student to pronounce correctly.

In order to achieve this object, in accordance with the invention, an apparatus for teaching correct pronunciation using drills comprises voicing analyzing means for analyzing the voice that accompanies the pronunciation, a memory for storing at least the result of voice analysis, a display for displaying at least the result of voice analysis, teacher keys and learner keys consisting of a plurality of operation keys, and means which control a pair of screen constitutions independently of each other on the display upon manipulation of those teacher keys and learner keys and which display the result of voice analysis in a comparative manner. The apparatus for teaching correct pronunciation may further be comprised of a filter and means which read voice data stored in a voice memory in said memory, convert through said filter the data that are read into voice data suited for intonation analysis or sound spectrograph analysis, and write the voice data into a working memory in the memory, or may further be comprised of means which repeat the writing operation for a voice rise memory in said memory such that a rising part of the voice data is written into the voice rise memory, switch the writing operation into the voice memory when the voice data become greater than a predetermined value so that voice data are successively written to the addresses that correspond to the voice rise memory in the voice memory, and transfer the voice data written into the voice rise memory to addresses of the voice memory after the writing operation has been finished. Or, the apparatus for teaching pronunciation may further be comprised of means which successively read pitch data written into a buffer memory in said memory, display the pitch data on the display when the pitch data is a voice sound, regenerate the voice corresponding to the pitch data of voice sound continuously read out thus far when the pitch data that is read out is a voiced sound and the pitch data read out in the next place is silent or is a voiceless sound, and carry out said series of operations again for the pitch data that are remaining after a predetermined period of time has passed, or may further be comprised of a sound-recording level adjusting volume that is provided in a signal transmission circuit of voice signal generating means other than the microphone.

In accordance with the invention, a teacher and a learner manipulate the teacher keys and the learner keys, respectively, and a pair of screens are controlled independently of each other to represent the result of voice analysis on the display.

To obtain intonation analysis or sound spectrograph analysis, the voice data stored in a voice memory are read out, converted through a filter into voice data suited for the analysis, and written into the working memory. The voice analysis is effected for the voice data stored in the working memory.

To record voice data produced from voice signal generating means, the writing operation is repeated so that the rising part of the voice data is written into a voice rise memory. The voice data that have become greater than a predetermined value are then written into the voice memory. After the voice data have been written into the voice memory, the rising part stored in the voice rise memory is written into the voice memory.

To practice intonation, pitch data are successively read out for a sentence that is stored in a buffer memory and that can be pronounced fluently. The pitch data is displayed on the display when the pitch data read out is a voiced sound. When the pitch data read out is a voiced sound and the pitch data read out in the next place is silent or is a voiceless sound, however, voices are regenerated that correspond to pitch data of voiced sounds continuously read out thus far, and the above-mentioned series of operations are carried out again for the remaining pitch data after a predetermined period of time has passed.

In the voice signal generating means, the output of the microphone is stored in the voice memory without its magnitude being adjusted.

BRIEF DESCRIPTION OF THE DRAWINGS

A preferred embodiment of the present invention will now be explained in conjunction with the drawings, wherein:

FIG. 9 shows how FIGS. 9(a) to 9(f) place together;

FIGS. 9(a) to 9(f) show the flowchart of the operation of the preferred embodiment;

FIG. 11 shows the relationship between FIG. 11(a) and FIG. 11(b);

FIGS. 15 and 17 are flowcharts illustrating other major portions of the operation of the preferred embodiment;

FIG. 16 is a diagram illustrating the correspondence between the gradation numbers in the light-and shade gradation and the light-and shade data.

DETAILED DESCRIPTION OF THE PREFERRED EMBODIMENT

Figure 1:
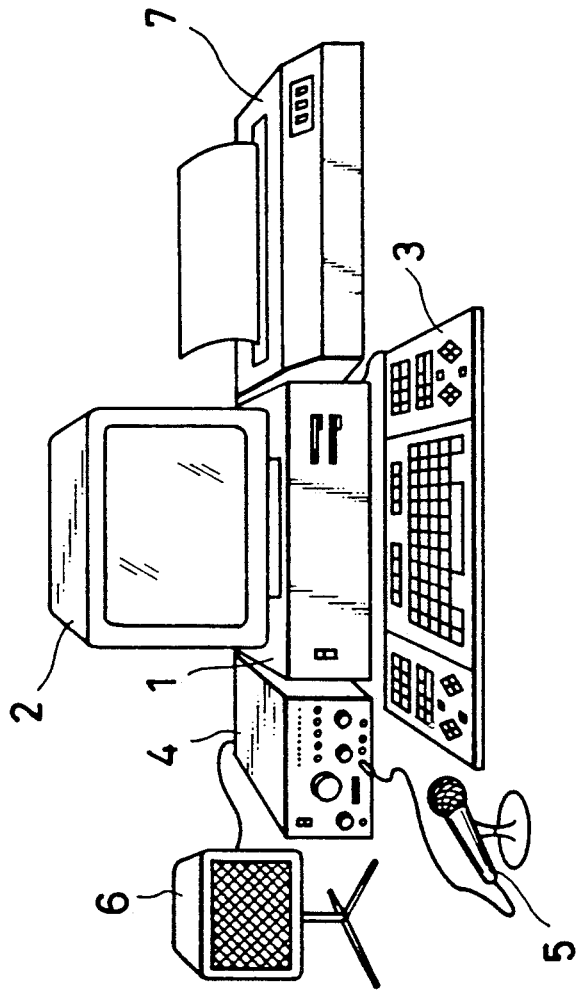
FIG. 1 is a perspective view illustrating the appearance of a preferred embodiment of the present invention.

In FIG. 1, reference numeral 1 denotes a personal computer, 2 denotes a display, 3 denotes a keyboard, 4 denotes a unit containing external circuits, 5 denotes a microphone, 6 denotes a speaker, and 7 denotes a well-known printer for obtaining hard copies and printed outputs.

Figure 2:
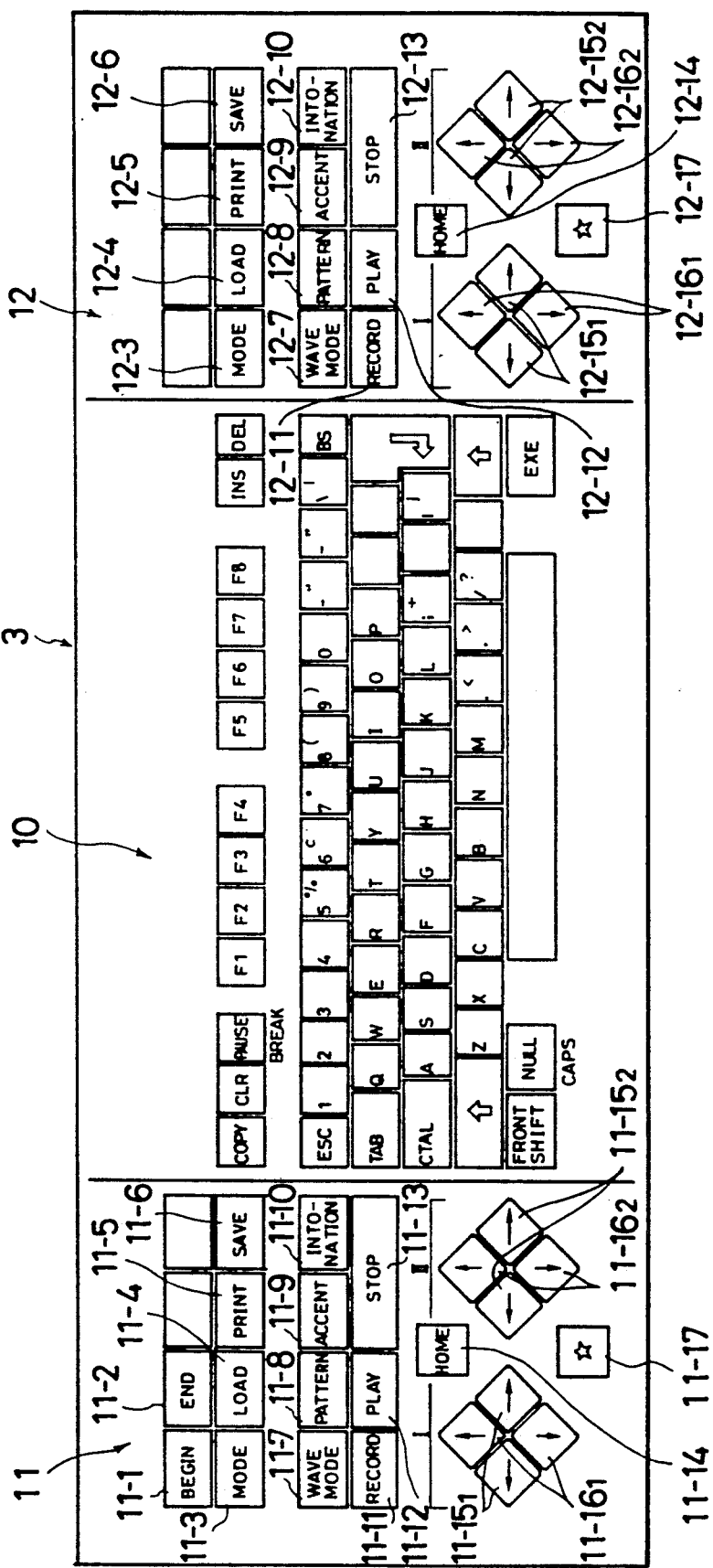
FIG. 2 is a plan view of the keyboard of the preferred embodiment.

The keyboard 3 consists, as shown in FIG. 2, of ordinary alphanumeric keys 10 arranged in the center, and two pluralities of special keys, i.e., teacher keys (hereinafter referred to as SCR1 keys) 11 and learner keys (hereinafter referred to as SCR2 keys) 12 arranged on the left and right sides, respectively. SCR1 keys 11 and SCR2 keys 12 have a plurality of operation keys 11-1 to 11-17 and 12-3 to 12-17, respectively. The difference between them is that SCR1 keys 11 include a BEGIN key 11-1 and an END key 11-2. Other keys are arranged in the same manner. The BEGIN key 11-1 is operated to input a signal representing the start of training and the END key 11-2 is operated to input a signal representing the completion. These keys are included in the SCR1 keys only in order to leave the manipulation thereof to the teacher's discretion.

The total number of keys is little different from that of the keyboard for general computers. Therefore, the positions and names of the keys may be simply changed as represented by the SCR1 keys 11 and the SCR2 keys 12 shown in FIG. 2, excluding the alphanumeric keys arranged in the center of the computer keyboard. Therefore, the key data communication between the key scanning of the keyboard 3 and the personal computer 1 is carried out according to a well known system.

Figure 3:
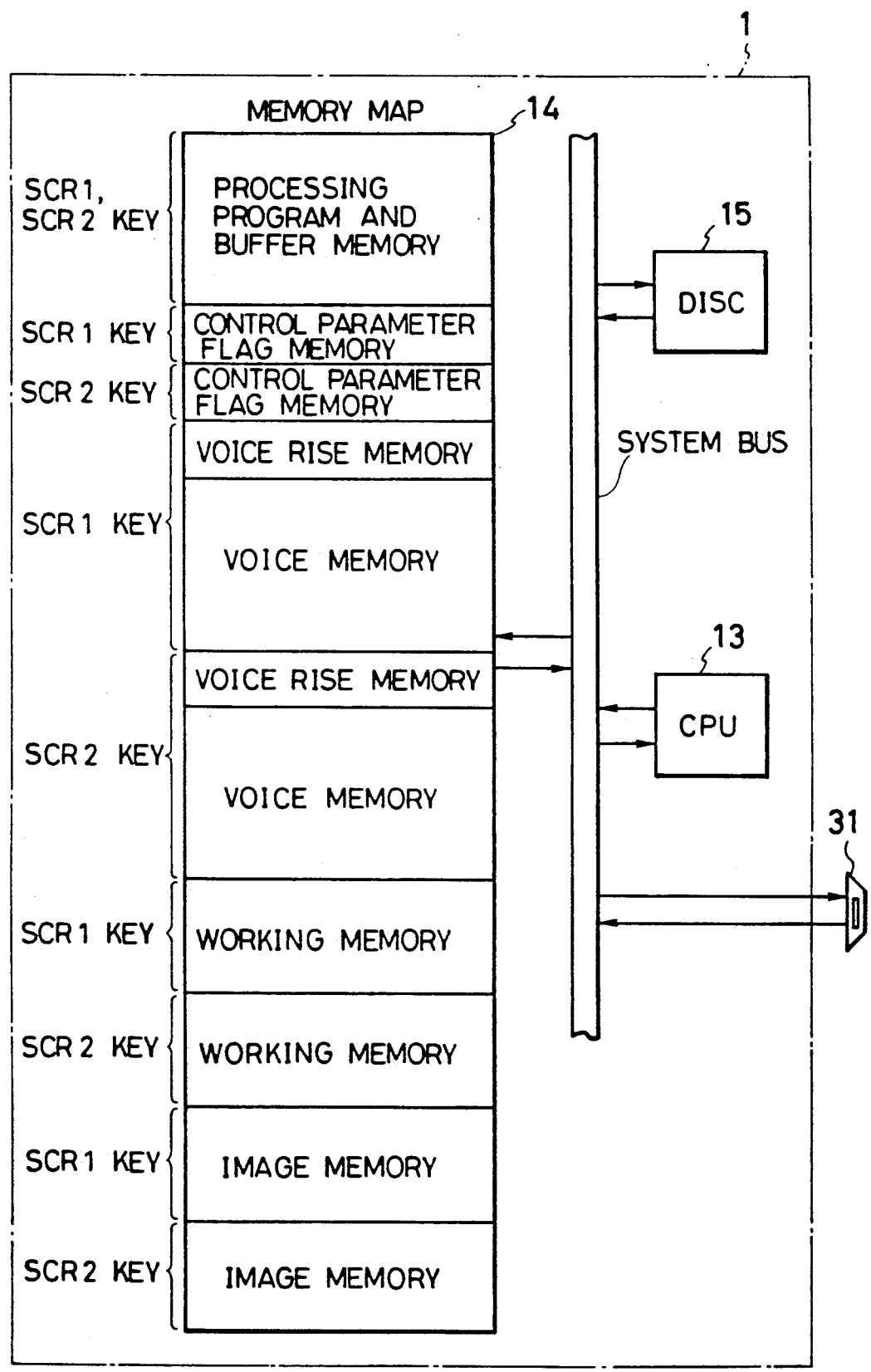
FIG. 3 is a diagram of a personal computer.

The personal computer 1 comprises a CPU 13, a memory 14 and a disc 15 as shown in FIG. 3. The memory 14 is made up of a processing program and buffer memory, a control parameter flag memory, a voice rise memory, a voice memory, a working memory, and an image memory. The processing program and buffer memory are commonly provided for SCR1 keys 11 and SCR2 keys 12. Other memories are provided for each of SCR1 keys 11 and SCR2 keys 12.

The voice memory stores a digital sample value of a voice signal that is to be analyzed, and the voice rise memory temporarily stores a digital sample value of a voice signal at a rise in the voice. The digital sample values are transferred to a corresponding region of the voice memory when the recording of sound is completed. The working memory stores digital values of voice signals that emphasize high-frequency components to express the result of sound spectrograph analysis (hereinafter referred to as pattern analysis) with a well-balanced homogeneous shade, or stores voice signals that have reduced amounts of undesired high-frequency components and decreased sample distance such that a basic frequency component that forms the pitch can be easily picked up in analyzing the pitch of the voice (hereinafter referred to as intonation analysis). The image memory stores the content that is to be displayed on the display 2. The personal computer 1 processes data in dependence on which key was depressed.

A series of processings in which the voice signal is analyzed from digital sample values stored in the voice memory, and the analyzed result is stored in the image memory and displayed on display 2, is described in Japanese Patent Application No. 303772/1986.

Figure 4A:
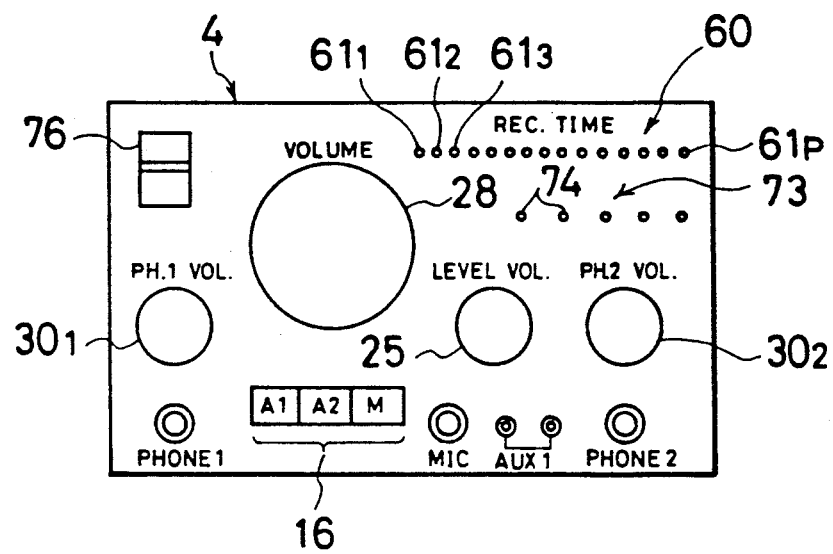
FIGS. 4(A) and 4(B) are front and rear views, respectively, of the unit in accordance with the preferred embodiment.
Figure 4B:
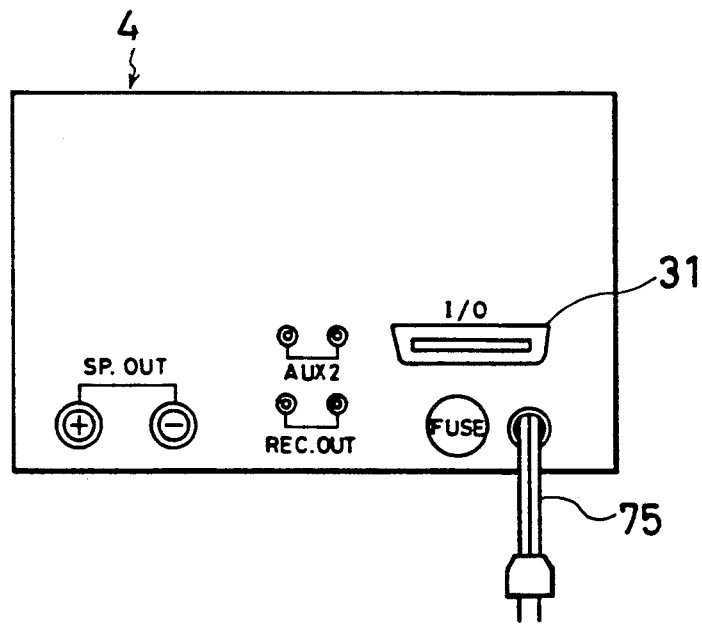
Figure 5:
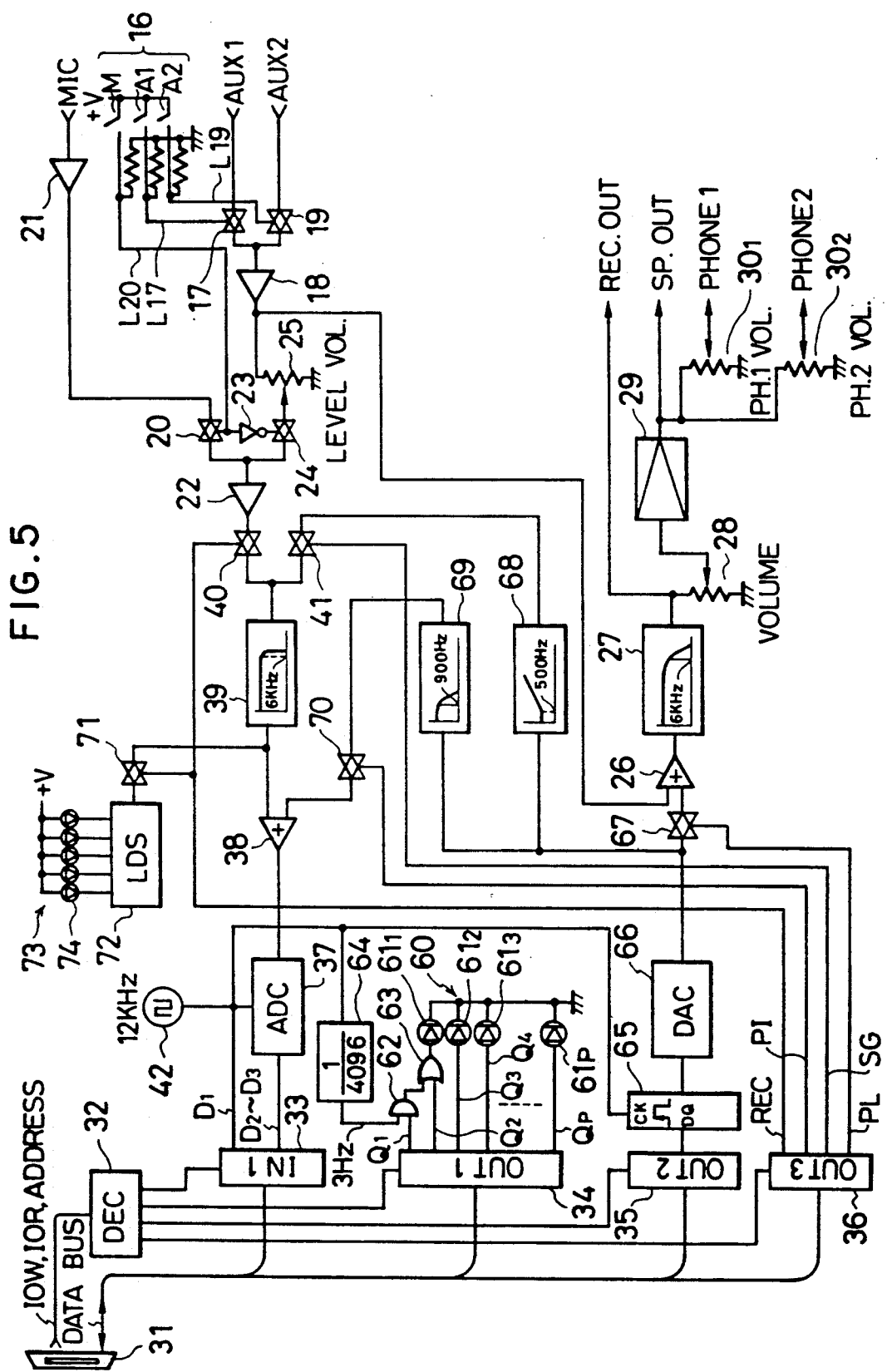
FIG. 5 is a diagram of an external circuit.

FIGS. 4(A) and 4(B) show the appearance of the unit 4 in detail, and FIG. 5 shows an external circuit contained therein.

In FIGS. 4 and 5, reference numeral 16 denotes an input selector which consists of switches A1, A2 and M. The switch A1 connects the external circuit to an input terminal AUX1 that is used when the sound output of a tape recorder (not shown) is to be recorded, the switch A2 connects the external circuit to an input terminal AUX2 that is used when the sound output of a video disc (not shown) is to be recorded, and the switch M connects the external circuit to an input terminal MIC that is used when the sound output of a microphone 5 is to be recorded. When the switch A1 is turned on, a line L17 assumes the high level "H" which causes an electronic switch 17 to be turned on, so that the input signal at the input terminal AUX1 is input to a buffer amplifier 18. When the switch A2 is turned on, a line L19 assumes the high level "H" which causes an electronic switch 19 to be turned on, so that the input signal at the input terminal AUX2 is input to the buffer amplifier 18. When the switch M is turned on, a line L20 assumes the high level "H" which causes an electronic switch 20 to be turned on, so that the input signal at the input terminal MIC is input to a buffer amplifier 22 via a buffer amplifier 21. When the switch M is turned off, the line L20 assumes the level "L". Therefore, the electronic switch 20 is turned off, and a NOT circuit 23 produces an output "H" which causes an electronic switch 24 to be turned on. When switch A1 or A2 is turned on, therefore, the input signal of the input terminal AUX1 or AUX2 is input to the buffer amplifier 22 via the buffer amplifier 18.

When the input signal of the input terminal AUX1 or AUX2 is input to the buffer amplifier 22, the magnitude of the voice signal is adjusted by a sound-recording volume level adjusting device 25 (LEVEL VOL).

When the input signal of the input terminal MIC is input to the buffer amplifier 22, on the other hand, the input signal does not pass through the adjusting device 25. Therefore, the volume of the speech can be determined depending upon the magnitude of the input signal. The volume of speech is important from the standpoint of teaching pronunciation. One of the problems which Japanese people encounter when speaking in English is the lack of speech volume. This is because the Japanese language is based on breast breathing and therefore lacks power in sound compared with the English language in which speech is based on abdominal breathing. Therefore, the distance between the mouth and the microphone 5 is maintained constant during speech and the analog voice waveform is displayed on the display 2. The speech volume is insufficient when the amplitude lies between the dotted lines LV, as represented by ($\alpha$) in FIG. 6. The volume is sufficient when the amplitude exceeds the dotted lines LV, as represented by ($\beta$).

The microphone 5 may be of the desktop type as shown in FIG. 1. Preferably, however, the microphone is of the type that is mounted on the head and is formed integrally with a headphone, since the distance between the mouth and the microphone is maintained constant.

The output of the buffer amplifier 18 is input to buffer amplifier 22 and is further input as a monitor signal to an adder amplifier 26. The output of adder amplifier 26 is sent to an output terminal REC.OUT and to a power amplifier 29 via a low-pass filter 27 that removes sampling noise and a speaker volume adjusting device 28 (VOLUME). The output of power amplifier 29 is sent to an output terminal SP.OUT to which the speaker 6 is connected, and is sent, via a pair of headphone volume adjusting devices $30_1$, $30_2$ (PH.1 VOL. and PH.2 VOL.), to output terminals PHONE 1 and PHONE 2 to which the headphone is connected. The output terminals PHONE 1 and PHONE 2 are independently prepared for the users of SCR1 keys 11 and SCR2 keys 12. Furthermore, the headphone volume adjusting devices $30_1$ and $30_2$ enable the individual persons to set their desired volumes. The low-pass filter 27 of the preferred embodiment has a cut-off frequency of 6 kHz and about $-24$ dB/OCT.

Reference numeral 31 denotes an I/O interface connector used for connecting the external circuit to the personal computer 1. To the connector 31 is connected a decoder 32 (DEC) which generates a read pulse to be supplied to an input port 33 (IN1) by decoding a port designation signal on an address wire input from the personal computer 1, an input command pulse IOR and an output command pulse IOW, and which further generates a write pulse that will be supplied to output ports 34 (OUT1), 35 (OUT2) and 36 (OUT3). The input wire of the input port 33 is connected to an A-D converter 37 (ADC), which is in turn connected to electronic switches 40 and 41 via an adder amplifier 38 and an anti-aliasing filter 39. In accordance with the preferred embodiment, filter 39 has a cut-off frequency of 6 kHz and $-70$ dB, which permits the passage of up to 6 kHz and cuts off frequencies higher than 6 kHz. Analog voice signals input from the adder amplifier 38 are converted into digital voice signals according to output signals of a main oscillator 42 having a frequency of 12 kHz. Light-emitting diodes (LED) $61_1$ to $61_p$ of a recording time indicator 60 that indicates the recording time (REC.TIME) are respectively connected to output terminals $Q_1$ to $Q_p$ of the output port 34. An AND gate 62 and an OR gate 63 are inserted between light-emitting diode $61_1$ and output terminal $Q_1$. One input terminal of AND gate 62 is connected to a frequency divider 64 which divides the output frequency of the main oscillator 42 by 4096 to obtain 3 Hz. Output port 35 is connected via latch 65 to a D-A converter 66 (DAC) which is connected, via an electronic switch 67, to adder amplifier 26. DAC 66 is further connected to electronic switch 41 via a high-pass filter 68 that emphasizes high-frequency components that are necessary for the pattern analysis. The D-A converter 66 is further connected to adder amplifier 38 via a low-pass filter 69 and an electronic switch 70. Filter 69 decreases undesired high-frequency components except the basic frequency components that form a pitch necessary for the intonation analysis.

The output terminal REC of output port 36 (OUT3) assumes the "H" level during the recording operation, whereby the electronic switch 40 is turned on to input the voice signal to the A-D converter (ADC) 37, and the electronic switch 71 is turned on to drive a level indicator 72 (LDS), whereby a plurality of LED's 74 constituting a level meter 73 are turned on by a number that corresponds to the input level. The output terminal PI of output port 36 assumes the "H" level during the operation of intonation analysis, whereby the electronic switch 70 is turned on, and the voice signal produced from the output port 35 is input to ADC 37 via low-pass filter 69. The output terminal SG of output port 36 assumes the "H" level during the operation of pattern analysis, whereby the electronic switch 41 is turned on and the voice signal produced from output port 35 is input to ADC 37 via high-pass filter 68.

In FIG. 4, reference numeral 75 denotes a power supply cord, and 76 denotes a power source switch.

Figure 6:
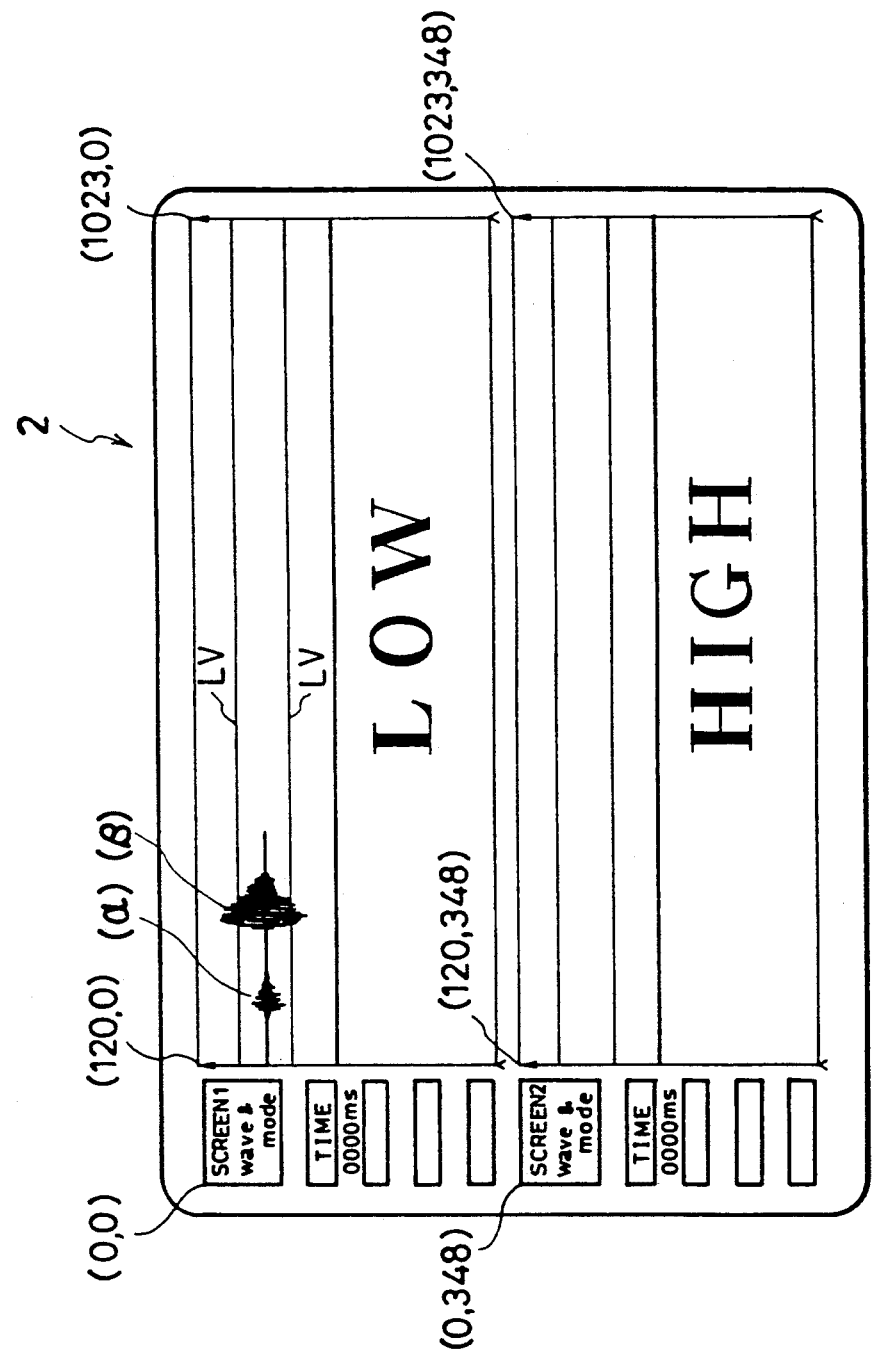
FIG. 6 is a front view showing an example of the display.

On the display 2 are displayed, as shown in FIG. 6, upper half and lower half screen constitutions SCREEN1 and SCREEN2 that are independently controlled by SCR1 keys 11 and SCR2 keys 12, respectively. On the display 2 of FIG. 6 coordinates of the main points are described. A personal computer 1 or a display 2 having a graphic ability of 1024 dots along the X axis and $348 \times 2$ dots along the Y axis can be used. Therefore, a low-cost conventional personal computer satisfies the need.

Figure 7:
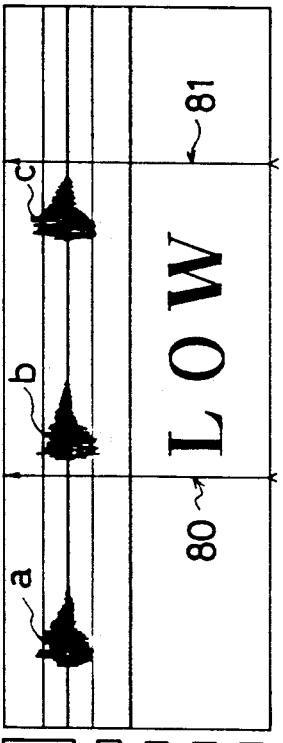
FIG. 7 is a diagram showing three analytical screens on display.
Figure 8:
FIG. 8 is a diagram illustrating a modified example of a display.
Figure 9B:
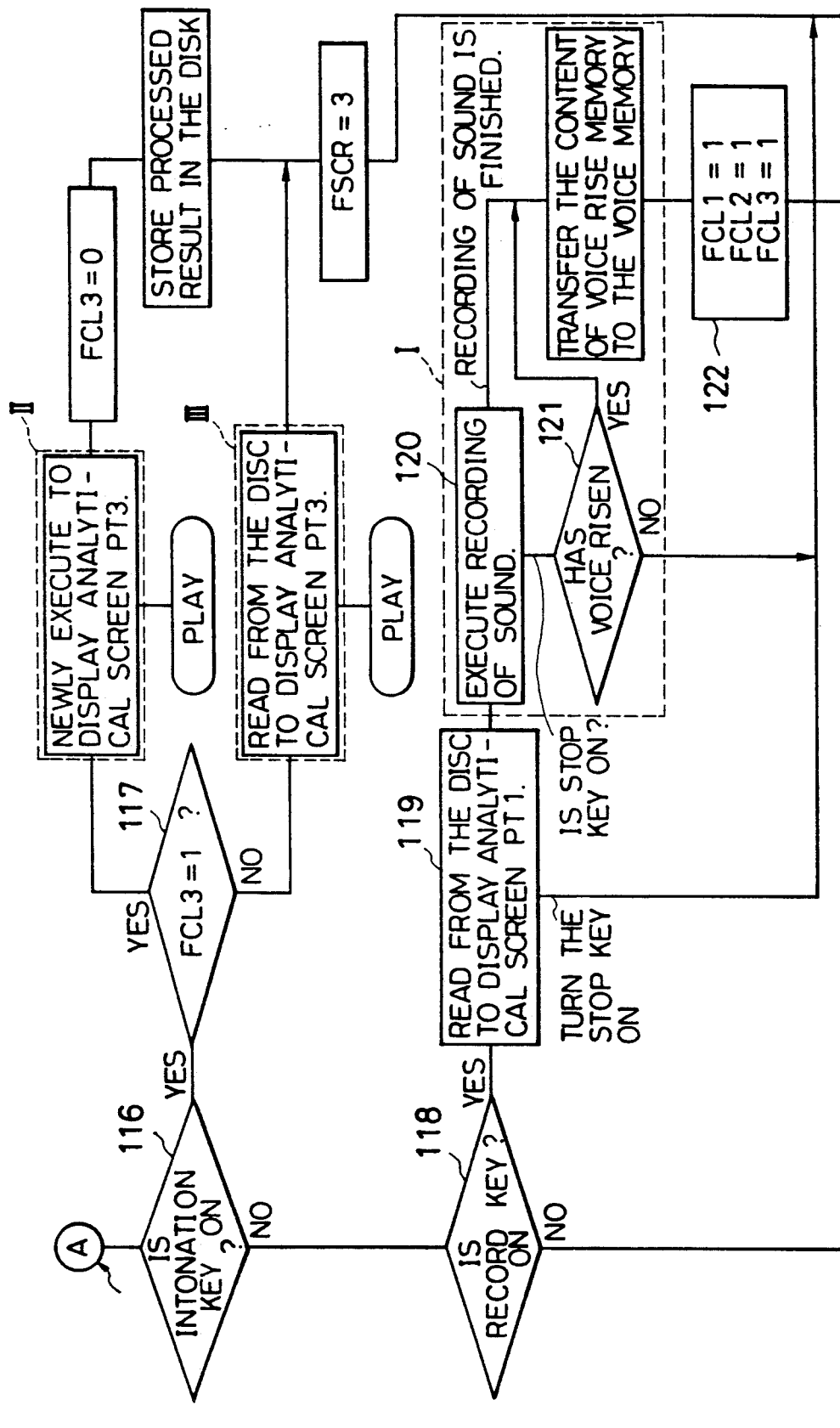
Figure 9C:
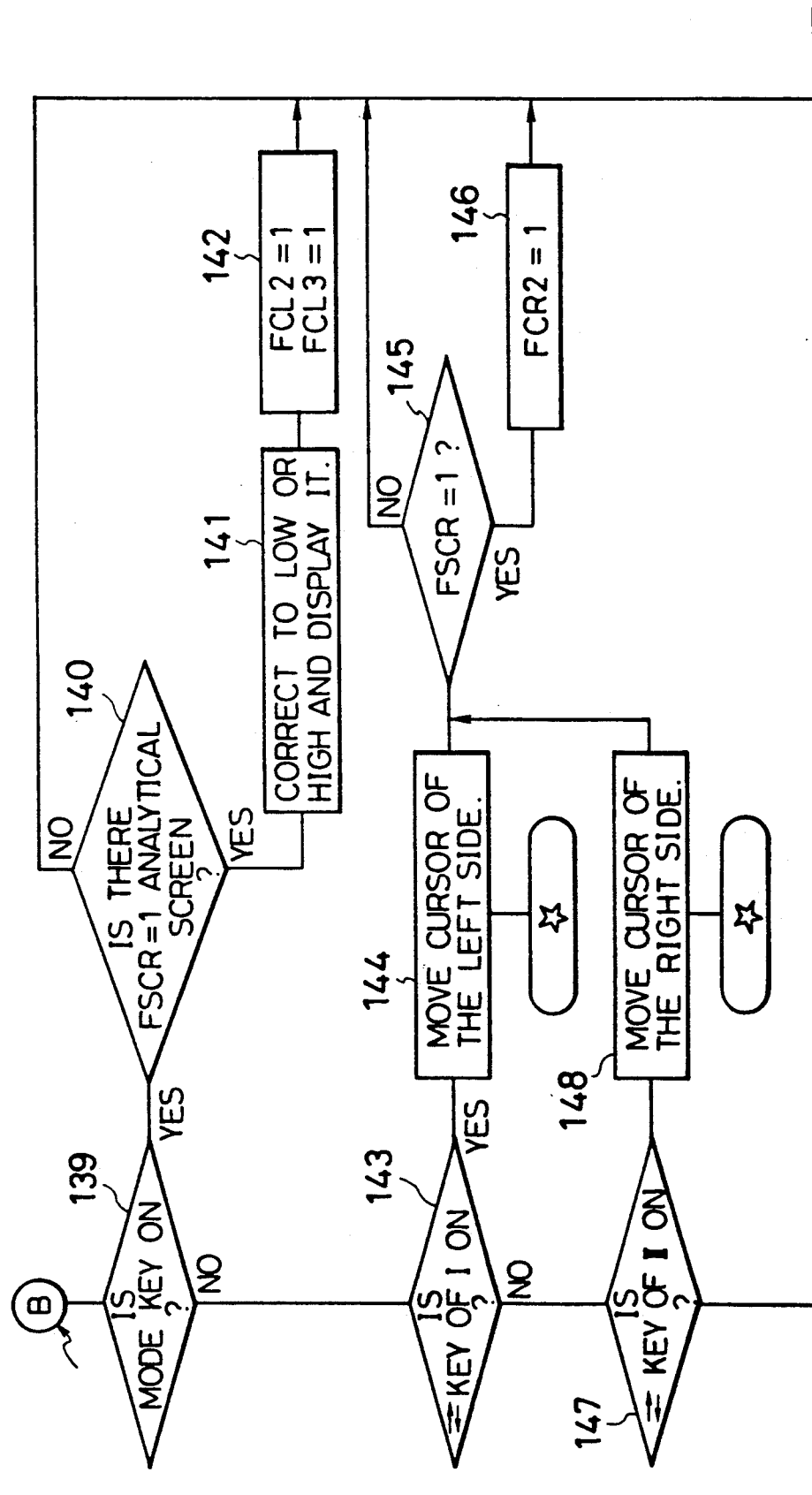
Figure 9D:
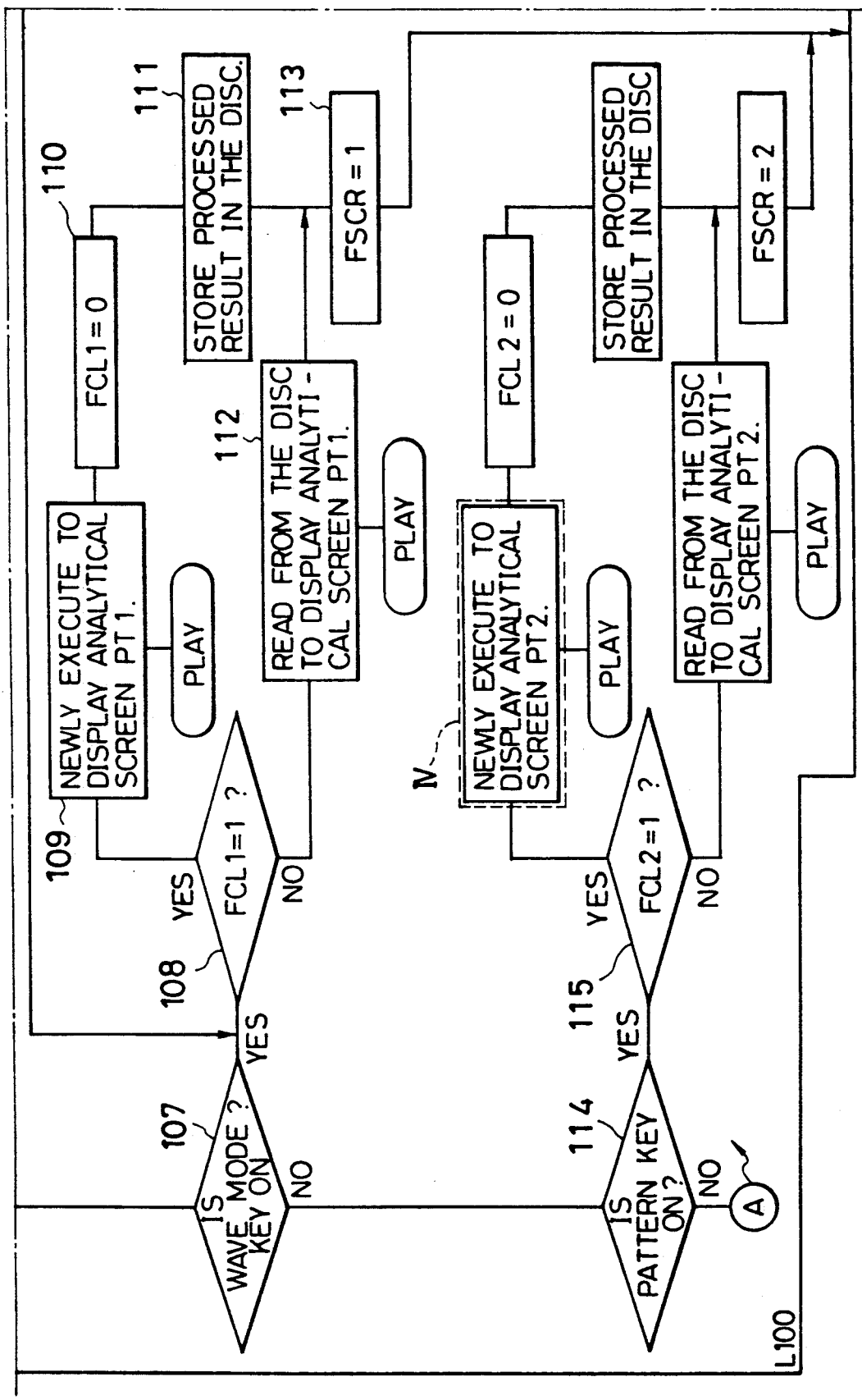
Figure 9E:
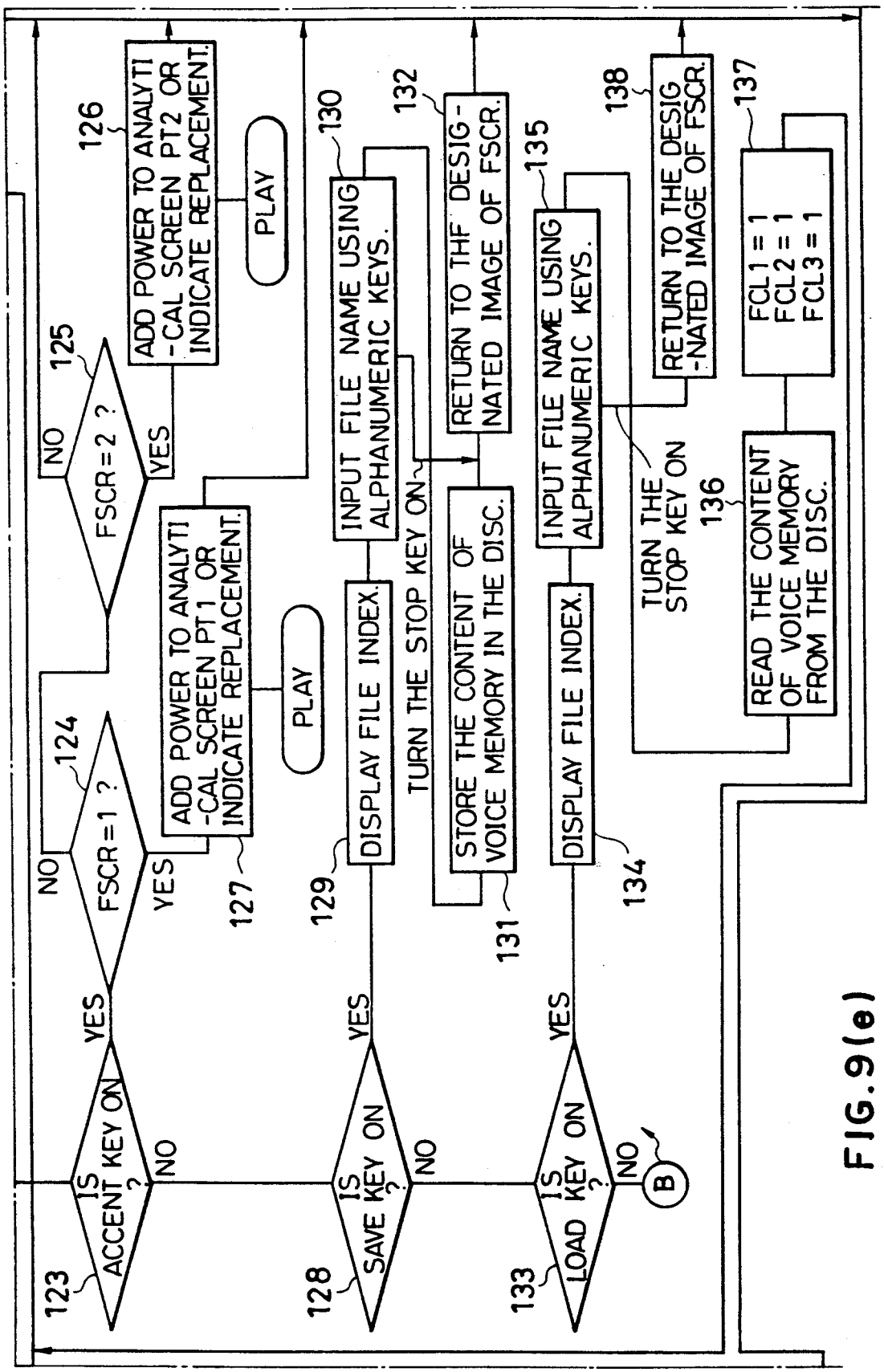
Figure 9F:
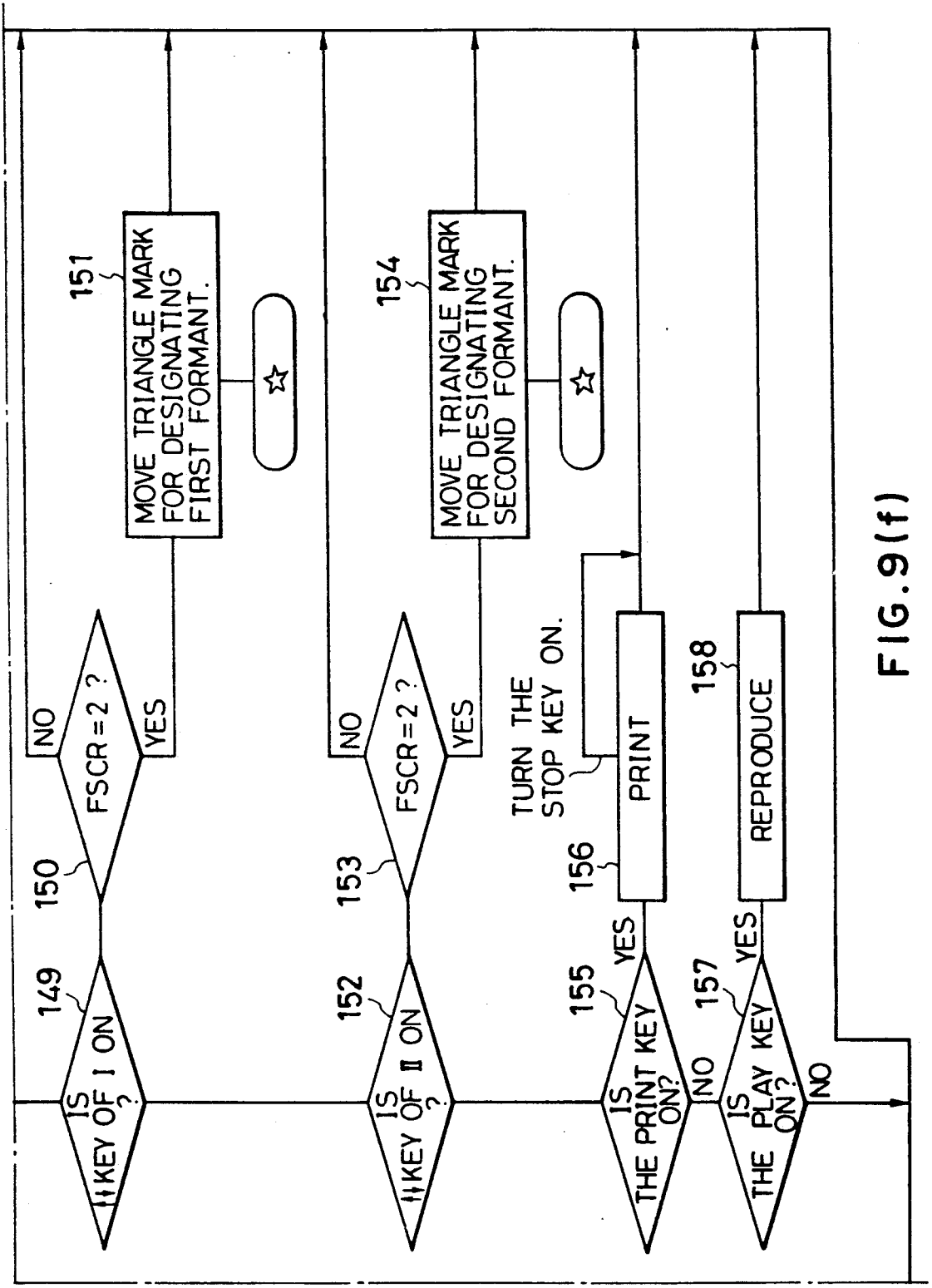

The screen constitution displayed on the display 2 has three analytical screens as shown in FIG. 7, i.e., PT1 for displaying voice waveforms and the analytical mode, PT2 for displaying the pattern analysis, and PT3 for displaying the intonation analysis. FIG. 8 shows the display PT2 to which the power analysis (hereinafter referred to as accent analysis) of the speech is added.

The upper half of the PT1 display exemplifies voice waveforms of /a/, /b/, /c/ pronounced by a Japanese person, and the lower half exemplifies the analytical mode "LOW". The analytical mode includes "LOW" and "HIGH", which define a frequency range for finding the size of the window and the pitch at the time of high-speed Fourier transformation depending upon the high and low of the voice of a learner. The PT2 display represents the pattern analysis of a range defined by cursors 80 and 81 of PT1. Portion 82 is a section view (the size of the spectrum is indicated by the length of the line) of a spectrum on a line of cursor 83 on the left side between cursors 83 and 84. A triangle 87 serves as a marker for the learner to find a first formant and a triangle 88 serves as a marker for finding a second formant. The PT3 display shows the whole intonation analysis of PT1.

Any one of the PT1, PT2 and PT3 displays is calculated by manipulating the SCR1 keys 11 and the SCR2 keys 12, and is displayed on the upper half SCREEN1 and the lower half SCREEN2 of the display 2.

The waveform of PT1 and analytical mode "LOW" are set on SCREEN1 of display 2 of FIG. 6, and the waveform of PT1 and analytical mode "HIGH" are set on SCREEN2.

The processing for displaying the analytical screens of FIGS. 6 to 8 using SCR1 keys 11 and SCR2 keys 12 will now be explained with reference to the basic flowchart shown in FIG. 9.

When the power source switch 76 is turned on, title image data is stored in the image memory of SCR1 keys 11 and SCR2 keys 12 in step 100, and the title is displayed on display 2. When depression of the BEGIN key 11-1 is detected in step 101, the training is started. Steps 102 and 103 detect whether the SCR1 keys 11 or the SCR2 keys 12 are depressed. These steps await the key input. When returned via L100 after the processing, the program arrives at these steps to await the next key input. When the SCR1 keys 11 are depressed, step 104 detects whether or not the END key 11-2 is depressed. When END key 11-2 is depressed, the program returns to the title image of step 100. When END key 11-2 is not depressed, step 105 sets a control parameter flag for the SCR1 keys. Similarly, when depression of a SCR2 key 12 is detected in step 103, step 106 sets a control parameter flag for the SCR2 keys. Upon setting of the flag, the subsequent processing is carried out by reading and writing the data that are set into the control parameter flag memory of memory 14 depending upon the SCR1 and SCR2 keys depressed.

The control parameter flag memory stores data necessary for processing the SCR1 and SCR2 key inputs, such as the address pointer, the analytical modes of "LOW" and "HIGH", the length of the window of the high-speed Fourier transformation, the frequency range data for picking up pitch, position data of the cursor, the analytical screens (PT1 to PT3 in FIG. 7) and corresponding flags (FSCR, FCL1 to FCL3). When it is detected in step 107 that a WAVE MODE key 11-7 or 12-7 is depressed, step 108 determines whether the flag FCL1 is "1" or "0". The flag FCL1 indicates whether the analytical screen PT1 up to the previous time is stored on a disc 15. When FCL1 is "1", it means that the analytical screen is not stored. Therefore, step 109 newly executes the processing to display the analytical screen PT1, step 110 sets FCL1 to "0", and step 111 stores the processed result on disc 15. When step 108 determines that flag FCL1 is "0", the results of processing up to the previous time that are stored on disc 15 are read in step 112 and then displayed. In steps 109 and 112, "PLAY" represents that when the PLAY key 11-12 of 12-12 is depressed during the processing, the process is stopped and the content in the voice memory is reproduced. The term "PLAY" hereinafter has the same meaning. The flag FSCR is set to "1" in step 113. The flag FSCR represents an analytical screen that is being displayed, i.e., PT1 when FSCR is "1", PT2 when FSCR is "2", and PT3 when FSCR is "3". The process is thus completed, and steps 102 and 103 await the next key input via L100.

Nest, when depression of a PATTERN key 11-8 or 12-8 for pattern analysis is detected in step 114, step 115 determines whether the flag FCL2 is "1" or "0". The flag FCL2 indicates whether or not the analytical screen PT2 up to the previous time has been stored on the disc 15. Hereinafter, the processing up to L100 passes through the same steps as those of the WAVE MODE key 11-3 or 12-3, and is not described again. When step 116 detects depression of the INTONATION key 11-10 or 12-10 for practicing intonation, step 117 determines whether a flag FCL3 is "1" or "0". The flag FCL3 indicates whether the analytical screen PT3 up to the previous time has been stored on the disc 15. Hereinafter, the processing up to L100 passes through the same steps as those mentioned above.

Figure 11A:
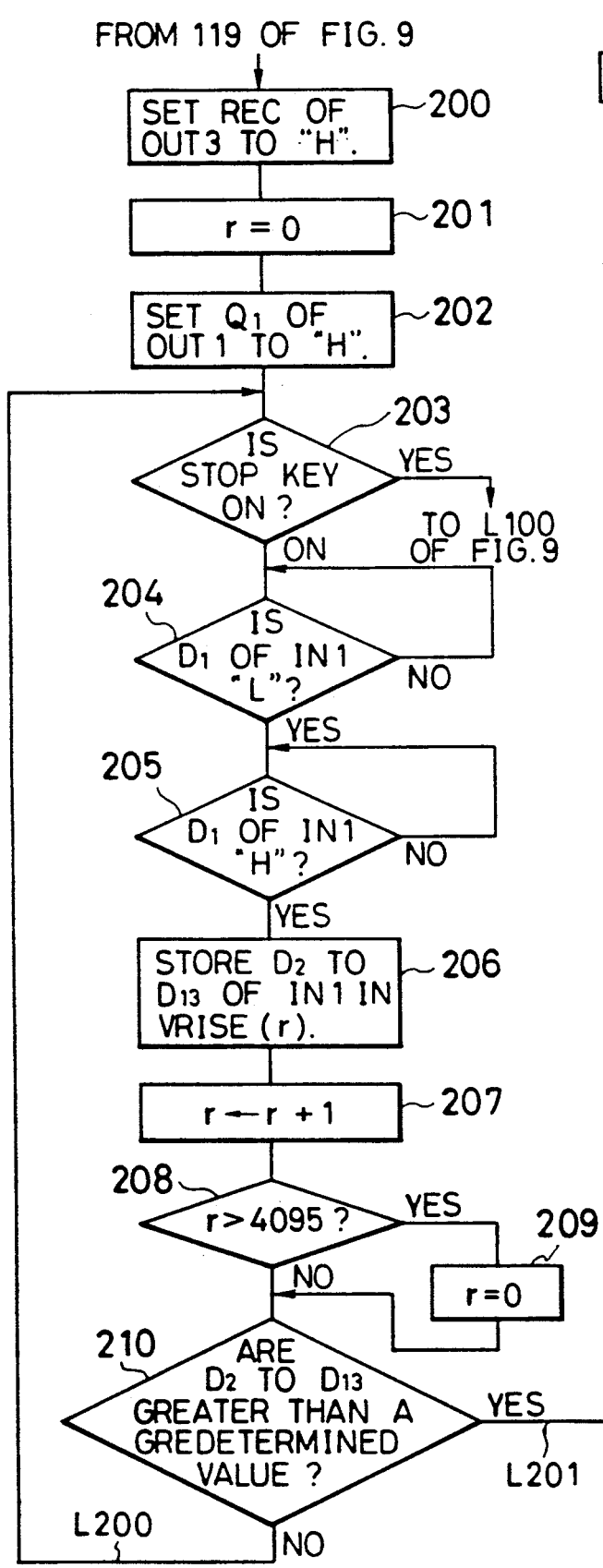
FIGS. 11(a) and 11(b) show a flowchart illustrating major portions of the operation of the preferred embodiment.
Figure 11B:
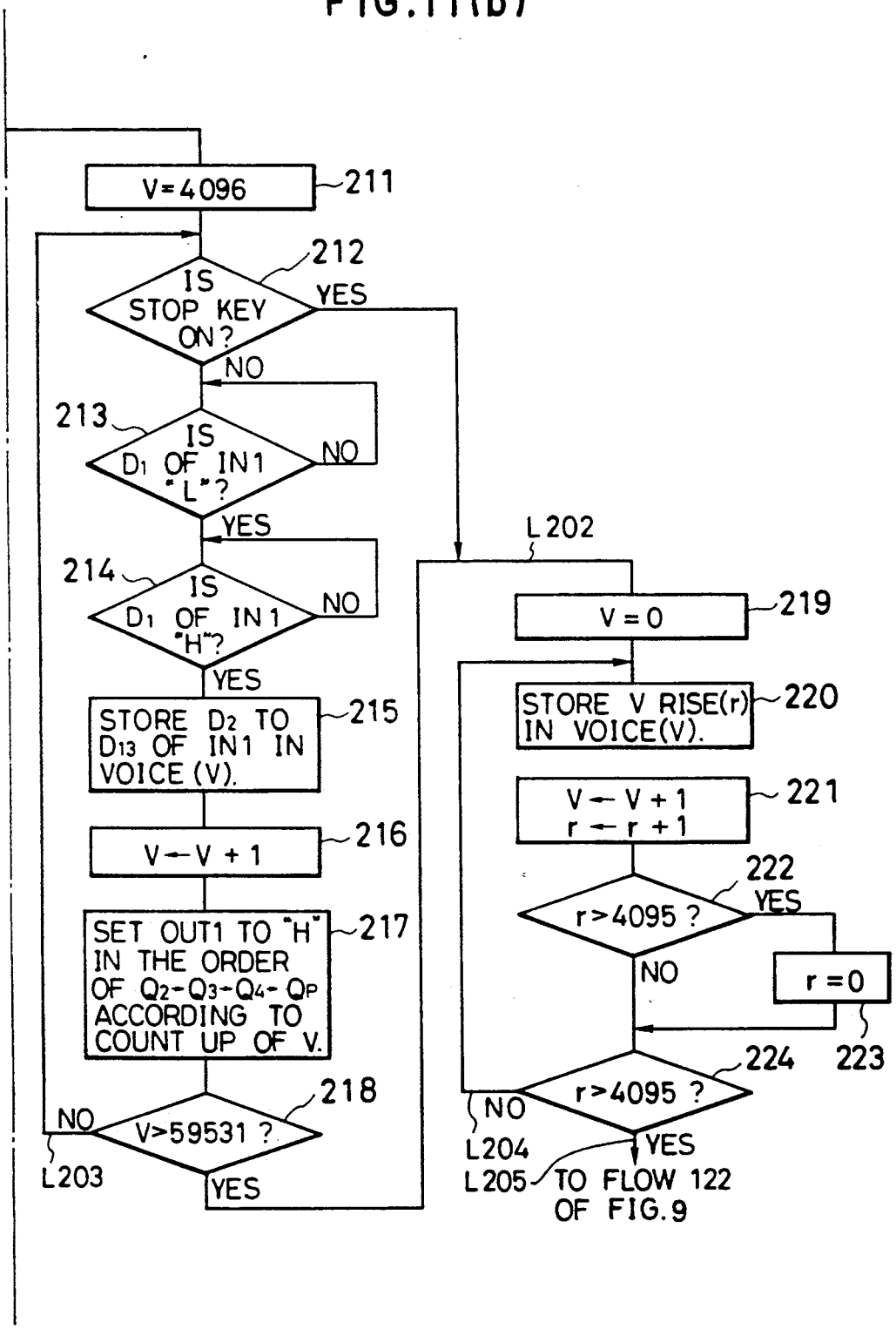

When step 118 detects depression of the RECORD key 11-11 or 12-11, step 119 reads the analytical screen PT1 up to the previous time from the disc 15 and displays it on display 2. Here, attention is drawn to whether the record made in the previous time should be erased. When a STOP key 11-13 or 12-13 is depressed, the program passes to L100. Recording of sound is executed in step 120. First, recording of sound is started for the voice rise memory. When the STOP key 11-13 or 12-13 is depressed before the voice input rises, this means that there was no input and the recording of sound is virtually cancelled. Therefore, the program reaches L100 via step 121 without erasing the content up to the previous time stored in the voice memory. Voice data can be newly written into the voice memory when the recording of sound is completed and when the STOP key 11-13 or 12-13 is depressed after the rise of the voice input. Thereafter, the content of the voice rise memory in which the rising part of the voice input is recorded is transferred to the voice memory, and the program proceeds to step 122. The surrounded portion I is shown in FIG. 11 in detail. Since the voice memory is refreshed, the step sets all of the flags FCL1, FCL2 and FCL3 to "1" to invalidate all analytical screens up to the previous time stored on disk 15, so that the processing can be newly executed, and the program proceeds to step 108. The analytical screen PT1 of voice data newly input via steps 108-111 and 113 is displayed, and L100 is reached. Therefore, the teacher or the learner sees voice waveforms input by himself, and depresses again the RECORD key 11-11 or 12-11 to effect the processing after step 119 in case the waveform α lies between the dotted lines LV.

When step 123 detects depression of the ACCENT key 11-9 or 12-9, steps 124 and 125 determine whether the analytical screen being displayed is PT1 (FSCR=1) or PT2 (FSCR=2). In the case of PT2, step 126 adds accent analysis as shown in FIG. 8 and in the case of PT1, step 127 adds accent analysis (power) or displays accent analysis instead of the analytical mode, before arriving at L100.

When it is desired to preserve the contents of the voice memory as a file, the SAVE key 11-6 or 12-6 is depressed. In this case, a file name is input using alphanumeric keys 10 of the keyboard 3 in step 130 via steps 128 and 129, and the SAVE operation executed. The contents of the voice memory are stored on disc 15 in step 131, and then the program proceeds to step 132. If the STOP key 11-13 or 12-13 is depressed at step 130, the filing is cancelled and the program proceeds directly to step 132 where the screen is returned to the analytical screen for a time before the file index is displayed.

Conversely, when it is desired to read the contents of the voice memory from the file that is preserved, the LOAD key 11-4 or 12-4 is depressed.

Via steps 133 and 134, the file name is input using the alphanumerical keys 10 in step 135, and the LOAD operation is executed in step 36, whereby the contents of the voice memory are read from the disc 15. Since the voice memory is refreshed even in this case, step 137 sets all of the flags FCL1, FCL2 and FCL3 to "1", so that the voice is analyzed again and is stored on disc 15. The program then proceeds to step 108 where the analytical screen PT1 of a new voice data is displayed before arriving at L100.

If the STOP key 11-13 or 12-13 is depressed at step 135, the reading of the file is cancelled. In step 138, therefore, the screen is returned to the analytical screen for a time before the file index is displayed, and L100 is reached.

When step 139 detects depression of the MODE key 11-3 or 12-3, step 140 determines whether the analytical screen on display is PT1 (FSCR = 1) or not. When the analytical screen PT1 is displayed, step 141 corrects the analytical mode. That is, the display is changed from "LOW" to "HIGH" or from "HIGH" to "LOW". This is accompanied by a change in the length of the window of the high-speed Fourier transformation in the control parameter flag memory of memory 14 and a change in the frequency range for picking up the pitch.

Therefore, the analytical screens PT2 and PT3 must be recalculated, and step 142 sets the flags FCL2 and FCL3 to "1", respectively, to newly effect the analysis, and then the program proceeds to L100.

When step 143 detects depression of the laterally moving cursor key 11-15$_1$ or 12-15$_1$, step 144 moves, for example, the left cursor 80 (FIG. 7). The position of the cursor 80 that is moved rewrites the cursor position data in the control parameter flag memory. In the analytical screen PT1, a portion sandwiched between the right and left cursors 80 and 81 is subjected to pattern analysis. Therefore, contrivance is necessary such that the analysis is newly effected when the cursor 80 is moved. In the analytical screen PT3, the voice is simply reproduced for a portion sandwiched between the right and left cursors 85 and 86. Therefore, the analysis need not be newly effected despite moving the cursors 85 and 86. The analytical screen PT2 also reproduces the voice between the cursors 83 and 84 like that of PT3, and the analysis need not be newly effected. Therefore, step 145 determines the analytical screen to be PT1 (FSCR = 1), step 146 sets the flag FSCR2 to "1" to newly effect the analysis, and the program proceeds to L100.

When step 147 detects depression of the laterally moving cursor key 11-15$_2$ or 12-15$_2$, step 148 moves, for example, the right cursor 81 (FIG. 7). Like the left cursor 80, the cursor position data is rewritten, and the program proceeds to step 145. Star marks in steps 144 and 148 indicate that the cursors 80 and 81 move at high speeds when the * keys 11-17 and 12-17 are depressed simultaneously with the laterally moving cursor keys 11-15$_1$ or 11-15$_2$ and 12-15$_1$ or 12-15$_2$, respectively. The star marks have the same meaning hereinafter.

When step 149 detects depression of the vertically moving cursor key 11-16$_1$ or 12-16$_1$, step 150 determines whether the analytical screen on display is PT2 (FSCR = 2) or not. This key moves the triangle mark 87 that indicates the first formant in FIG. 7. Only in the case of the analytical screen PT2 in step 151, therefore, is the triangle mark 87 moved to indicate the first formant.

Even when depression of the vertically moving cursor key 11-16$_2$ or 12-16$_2$ is detected in step 152, step 153 selects the case of the analytical screen PT2 just like the case of the cursor keys 11-16$_1$ and 12-16$_1$, and step 154 moves the triangle mark 88 that indicates the second formant in FIG. 7.

When depression of PRINT key 11-5 or 12-5 is detected in step 155, a hard copy is printed on the display screen in step 156. The printing stops when STOP key 11-13 or 12-13 is depressed during the printing operation.

When depression of PLAY key 11-12 or 12-12 is detected in step 157, the contents of the voice memory are reproduced in step 158.

Though not diagrammed in FIG. 9, when the HOME keys 11-14 and 12-14 are depressed, the cursors 80 and 81, 83 and 84, and 85 and 86 more toward the extreme left and extreme right, respectively, and the triangle marks 87 and 88 move toward the lower end.

The sound-recording operation (surrounded portion I), the intonation analyzing operation (surrounded portion II) and the pattern analyzing operation (surrounded portion IV) illustrated in the basic flowchart of FIG. 9 will now be described in detail.

Figure 10:
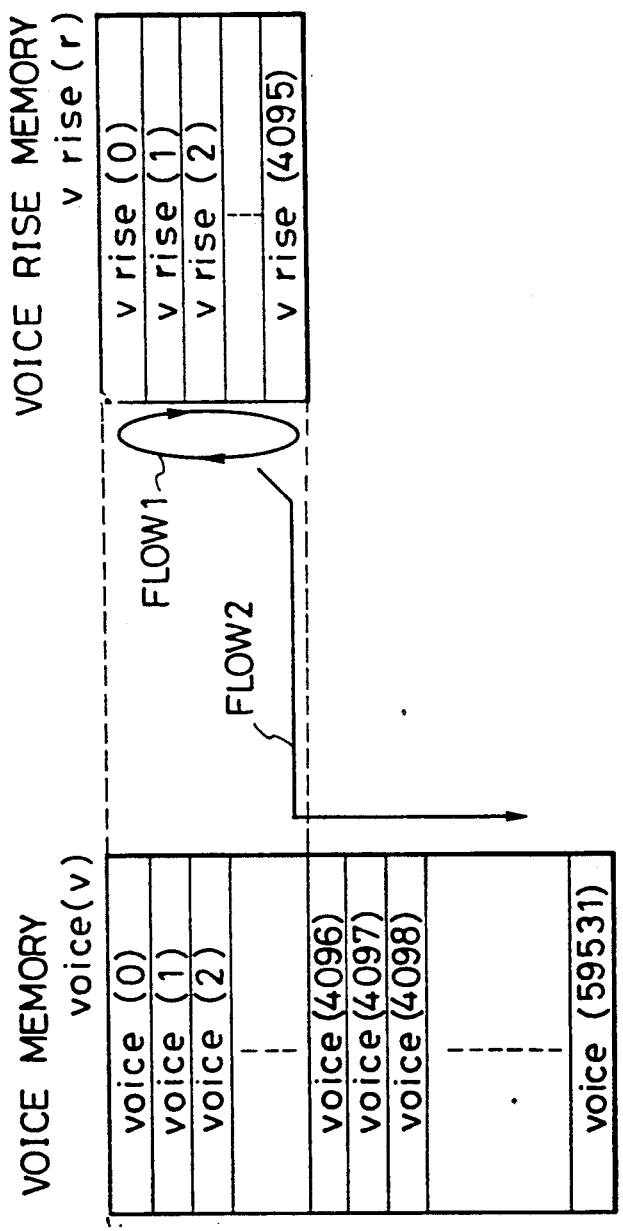
FIG. 10 is a diagram illustrating the memory.

As shown in FIG. 10, the voice memory is capable of storing 59,532 voice data, e.g., voice datum (0) to voice datum (59,531). The analog voice data are converted into digital data $D_2$ to $D_{13}$ (12 bits) through A-D converter 37 according to a main oscillator 42 of 12 kHz and are stored in the voice memory. Therefore, the time duration of each voice datum is 0.083 milliseconds. The voice memory therefore stores 59,532 voice data lasting about 4.96 seconds.

The number 59,532 is related to the screen display. That is, in the display 2 shown in FIG. 6, the range in the direction of the X axis capable of displaying the waveform has 1023 minus 120 minus 1 = 902 dots. When the waveform of the content in the voice memory is to be displayed, therefore, 66 voice data, i.e., 59,532/902 = 66, should be displayed as one dot. This can be done by finding a maximum value and a minimum value out of the 66 voice data, and connecting them (for further detail, refer to Japanese Patent Application No. 303772/1986).

The voice rise memory, which plays the role of a buffer to determine whether the voice input has risen sufficiently or not, has a memory capacity of 4096 data, e.g., voice rise datum (0) to voice rise datum (4095) as shown in FIG. 10, and is capable of storing voice data having a length of about 341 milliseconds.

A relationship between the voice rise memory and the voice memory will now be described with reference to FIG. 11.

First, when the output terminal REC of the output port 36 (OUT3) shown in FIG. 5 assumes the "H" level in step 200, the electronic switches 40 and 71 are turned on. Any one input signal (voice signal) at the input terminal MIC, AUX1 or AUX2 selected by the input selector 16, is input to the A-D converter 37 through electronic switch 40, anti-aliasing filter 39 and adder amplifier 38. The input level thereof drives the level indicator 72 via electronic switch 71, and the LEDs 74 in the level meter 73 are turned on depending upon the input level. The volume level of the speech is checked based thereupon.

Figure 12:
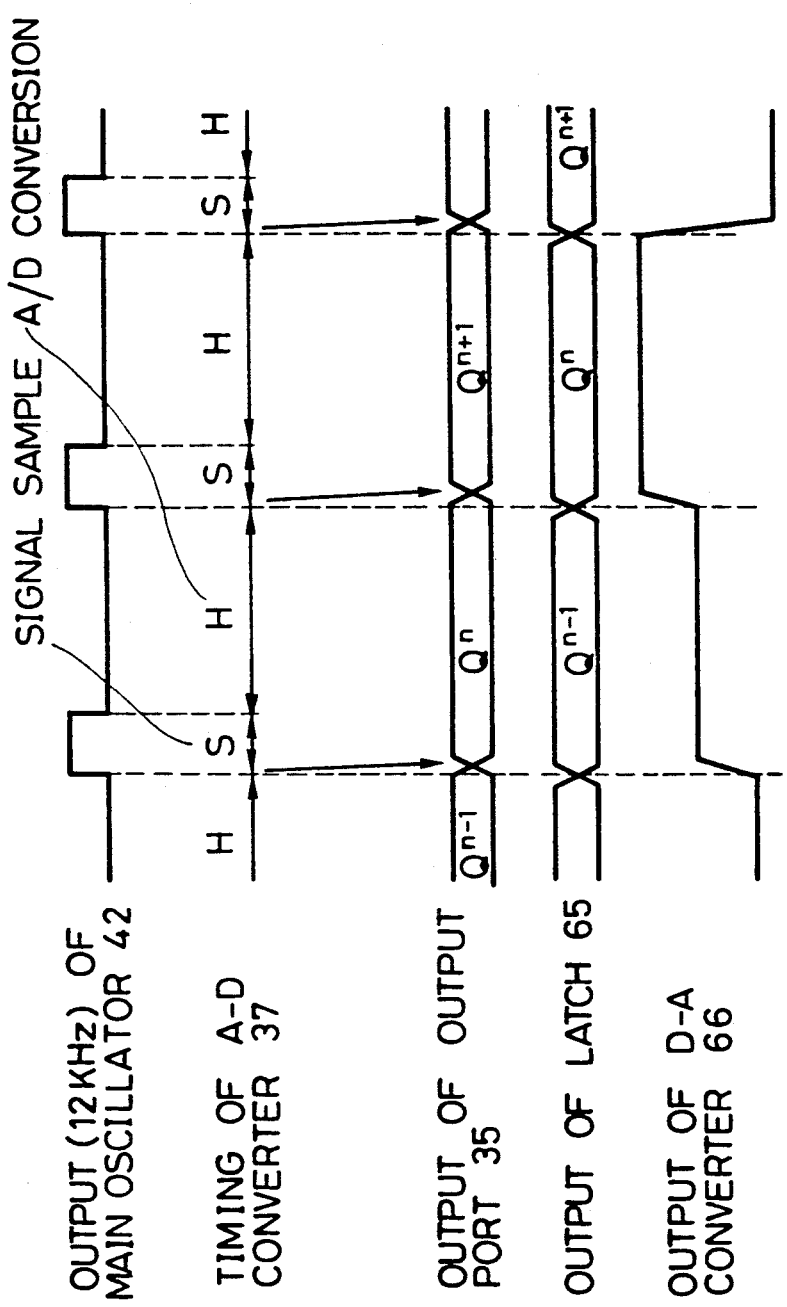
FIG. 12 is a timing diagram illustrating the operation of important portions of the preferred embodiment.

A voice rise memory pointer r is set to 0 in step 201. As the output terminal Q1 of the output port 34 (OUT1) assumes the "H" level in step 202, the 3-Hz output of the frequency divider 64 passes through the AND gate 62, and an LED 61$_1$ of a sound-recording time indicator 60 flashes via OR gate 63. The user therefore confirms that the sound-recording operation is taking place. Step 203 detects whether the STOP key 11-13 or 12-13 is depressed. When the STOP key 11-13 or 12-13 is depressed before the voice rises, it means that the sound recording is cancelled and the operation for recording sound is finished. Steps 204 and 205 detect signals of 12 kHz of the main oscillator 42 input to the terminal $D_1$ of the input port 33 (IN1). The timing of the A-D conversion of the A-D converter 37 is executed by the output of the main oscillator 42 as shown in FIG. 12. After the output of the "L" level by the main oscillator 42 is detected in step 203, therefore, the conversion data is received by the input port 33 immediately after the "H" level is detected in step 205. Conversion data $D_2$ to $D_{13}$ input to the input port 33 in step 206 are stored in the voice rise pointer (r) of the voice rise memory. The pointer is increased in step 207 and is circulated in steps 208 and 209. Step 210 determines whether the conversion data $D_2$ to $D_{13}$ of voice signals are greater than a predetermined value, i.e., determines whether the voice data have risen. When the voice data have not risen, the program proceeds to step 203 via L200, and the conversion data $D_2$ to $D_{13}$ are written in a circulating manner as indicated by FLOW1 in FIG. 10 at the addresses of the 4096voice rise data of the voice rise memory. When the conversion data $D_2$ to $D_{13}$ of voice signals have exceeded a predetermined value, the program proceeds to L201, whereby the conversion data are written starting from the 4097-th voice datum (4096) of the voice memory as indicated by FLOW2 in FIG. 10.

Step 211 sets the voice memory pointer v equal to 4096, and step 212 detects whether or not the STOP key 11-13 or 12-13 is depressed. When the STOP key 11-13 or 12-13 is depressed while the sound is being recorded, writing into the voice memory is stopped and the program proceeds to L202. Like the above-mentioned case, steps 213 and 214 detect the "L" and "H" levels at the terminal $D_1$ of the input port 33, and step 215 stores the converted data $D_2$ to $D_{13}$ in the voice memory pointer (v). Step 216 increases the pointer (v) and step 217 shifts the LEDs $61_2$ to $61_p$ that are turned on in the sound-recording time indicator 60 accompanying the count-up of the pointer (v) so that the user is able to know the progress of the sound-recording time in the voice memory. That is, if the lighting is advanced every 500 milliseconds, the level "H" should be shifted in the order of output terminals $Q_2 \rightarrow Q_3 \rightarrow Q_4$ of the output port 34 (OUT1) each time v counts up 6000, since $500/0.083 = 6000$. For example, as v exceeds 6000 and the "H" level is shifted from $Q_1$ to $Q_2$AND gate 62 is turned off and the output of OR gate 63 assumes the "H" level due to $Q_2$, whereby the LED $61_1$ that had been flashing is then turned on continuously. As v exceeds 12,000 and the "H" level is shifted from $Q_2$ to $Q_3$, the output of OR gate 63 assumes the "L" level, whereby LED $61_1$ is turned off and the second LED $61_2$ is turned on. As v exceeds 18,000 and the "H" level is shifted from $Q_3$ to $Q_4$, the second LED $61_2$ is turned off and the third LED $61_3$ is turned on. The same holds true hereinafter. Step 218 detects the completion of sound recording when v exceeds 59,531. So long as the final portion of the voice memory is not passed, the program returns via L203, and voice data are written successively into the address for the voice data of the voice memory, i.e., voice datum (4096), voice datum (4097), voice datum (4098), . . . , voice datum (59,531). After the recording of sound is finished, the contents of the voice rise memory are transferred to the voice memory and completely stored therein. That is, after the completion of step 218, the program passes through L202, and step 219 sets the voice memory pointer v equal to 0. Step 220 transfers only the contents of the voice rise memory pointer (r) to the memory. Step 221 increases the two pointers v and r, and steps 222 and 223 circulate the voice rise pointer r. Step 224 detects the completion of transfer. So long as the contents of the voice rise memory are not all transferred, the program returns via L204 to transfer the contents successively. After the completion of transfer, the voice memory becomes perfect, whereby the program proceeds to L205 and then starts to display the waveforms of the analytical screen PT1 via step 122 of FIG. 9. The transfer of the contents of the voice rise memory to the voice memory in step 220 is effected successively starting from a content that is increased by unity compared with the content when it was determined in step 210 that the conversion data $D_2$ to $D_{13}$ of voice rise datum (1525) of the voice rise memory are greater than a predetermined value, the time of passage of the contents of the voice rise memory is such that the voice rise datum (1526) next to voice rise datum (1525) is the oldest, and voice rise datum (1525) is the newest followed by voice rise datum (1527), voice rise datum (1528), etc. Therefore, voice rise datum (1526) is transferred to the address of voice datum (0), voice rise datum (1527) is transferred to the address of voice datum (1), voice rise datum (1528) is transferred to the address for voice datum (2), . . . , and voice rise datum (1525) is transferred to the address for voice datum (4095), such that the voice memory will have a perfect time passage of sound recording. With reference to the case of FIG. 11, step 206 stores the conversion data $D_2$ to $D_{13}$ in the address for voice rise datum (1525), step 207 sets r=1526, step 210 determines whether it is greater than a predetermined value, and the program proceeds to L201. Since step 220 first transfers voice rise datum (1526) to the address of voice datum (0) and step 221 increases the two pointers, then voice rise datum (1527) is transferred to the address of voice datum (1). The same holds true hereinafter.

With the voice rise memory being provided as described above, the recording of sound into the voice memory automatically starts in response to the rise of the voice input, the recording of sound is cancelled when the STOP key 11-13 or 12-13 is depressed before the rise of the voice input, and the content of the voice memory obtained in the previous time is not erased. Furthermore, since voice data at a time before the rise are stored for about 340 milliseconds in the voice rise memory, there is no likelihood that the recording of sound starts from the middle.

Figure 13:
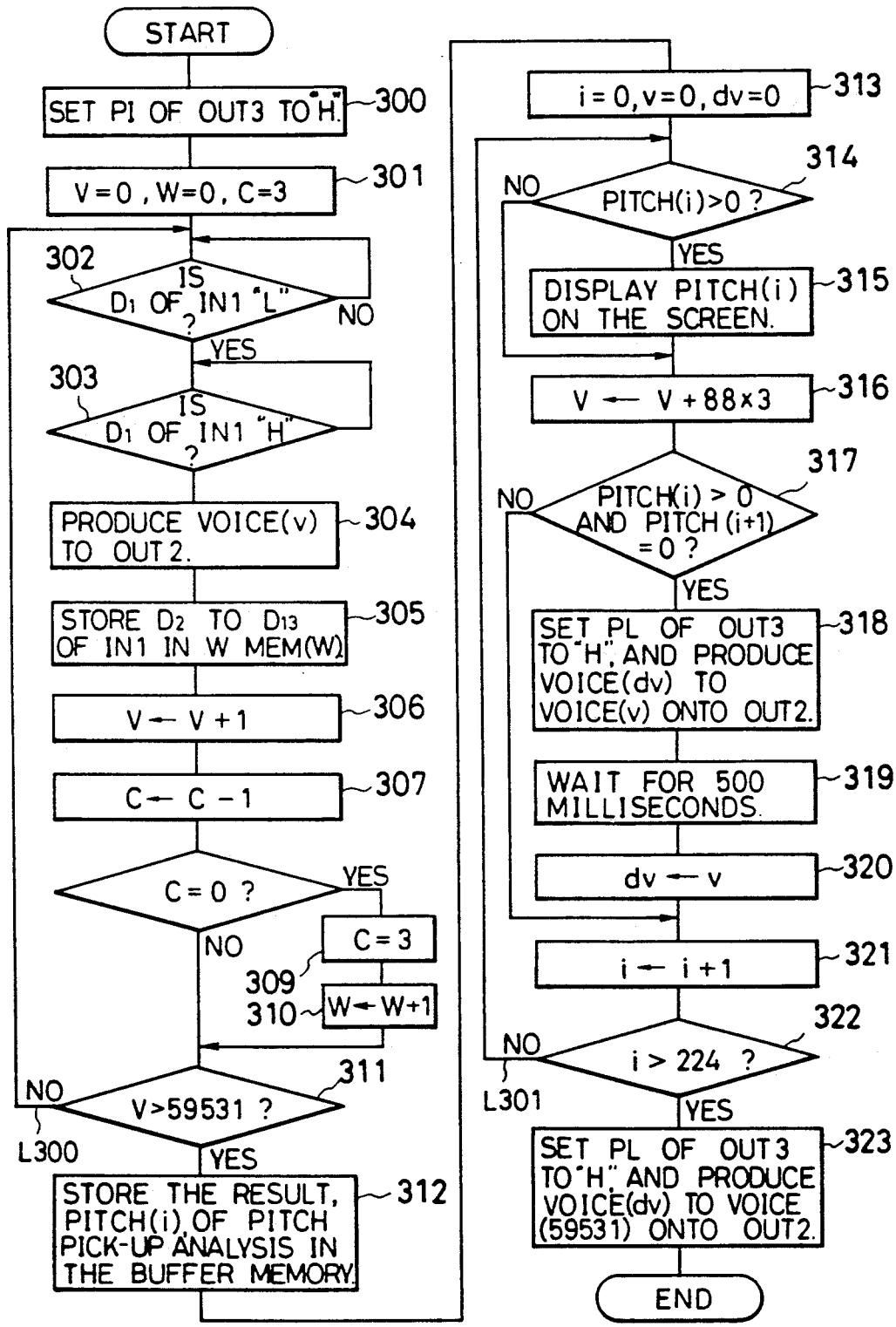
FIG. 13 is a flowchart illustrating other major portions of the operation of the preferred embodiment.

The intonation analyzing operation is carried out by surrounded portion II in the basic flowchart of FIG. 9, and its details are shown in the flowchart of FIG. 13.

First, as the output terminal PI of the output port 36 (OUT3) assumes the "H" level in step 300, an electronic switch 70 is turned on. The output of the D-A converter 66 is input to the A-D converter 37 via low-pass filter 69, electronic switch 70 and adder amplifier 38.

Step 301 sets the voice memory pointer v equal to 0, working memory pointer w equal to 0, and counter c equal to 3, and steps 302 and 303 detect the 12 kHz output of the main oscillator 42 input to the terminal $D_1$ of the input port 33 (IN1). As the terminal $D_1$ changes from the "L" to the "H" level, voice data are sent from voice pointer (v) of the voice memory to the output port 35 (OUT2) in step 304. The timing of the output varies depending upon the determining timing of the personal computer 1, and does not form a constant time but contains jitter. Therefore, after the synchronism is maintained by the latch 65 at the rising edge of the 12 kHz output, the voice data is converted into an analog voice signal through the D-A converter 66 (see FIG. 12). After high-frequency components, undesirable for picking up the pitch, are removed by the low-pass filter 69, the analog voice signal is converted again into a digital voice signal by the A-D converter 37. Step 305 receives the conversion data $D_2$ to $D_{13}$, and stores that data in the working memory. Step 306 increases the voice memory pointer, and step 307 decreases the counter c. In steps 308 to 310, the working memory pointer w does not increase until c is set equal to 0. In other words, the working memory pointer w is increased after the conversion data $D_2$ to $D_{13}$ are written three times into the working memory every time when the program passes through step 305. Therefore, the remaining conversion data are written after every third time. This means that the sampling frequency of the working memory has dropped to 12 kHz/3 = 4 kHz. The band of analog voice signals is narrowed to about 900 Hz using the low-pass filter 69, which is sufficient. In this case, therefore, the capacity of the working memory should be greater than $\frac{1}{3}$ of the voice memory, i.e., 59,532/3 = 19,844, so that the working memory stores working memory data (0) to (19,843). Step 311 detects the completion of reproduction of the voice memory. Before the final portion of the voice memory is exceeded, the program returns via L300, and the conversion data $D_2$ to $D_{13}$ are written successively into the working memory.

Based upon the content of the working memory storing the conversion data $D_2$ to $D_{13}$, step 312 picks up and analyzes the pitch and stores the result as pitch value data (i) in the buffer memory. It is now presumed that a pitch value datum is obtained for every 88 conversion data of the working memory. A pitch value datum (0) is calculated for working memory data (0) to (87), a pitch value datum (1) is calculated for working memory data (88) to (175), etc. Since the number of locations for data in the working memory is 19,844, the buffer memory requires 19,844/88 = 225.5 locations for storing calculated pitch value data (0) to (224).

The method of calculating the pitch value data does not pertain to the gist of the present invention, and is not described here in detail (refer to Japanese Patent Application No. 303772/1986).

After step 313, the display of intonation and the pronounced voice are reproduced intermittently to execute the intermittent reproduction operation in order to clarify the correspondence between the display of intonation and the pronounced voice.

Figure 14:
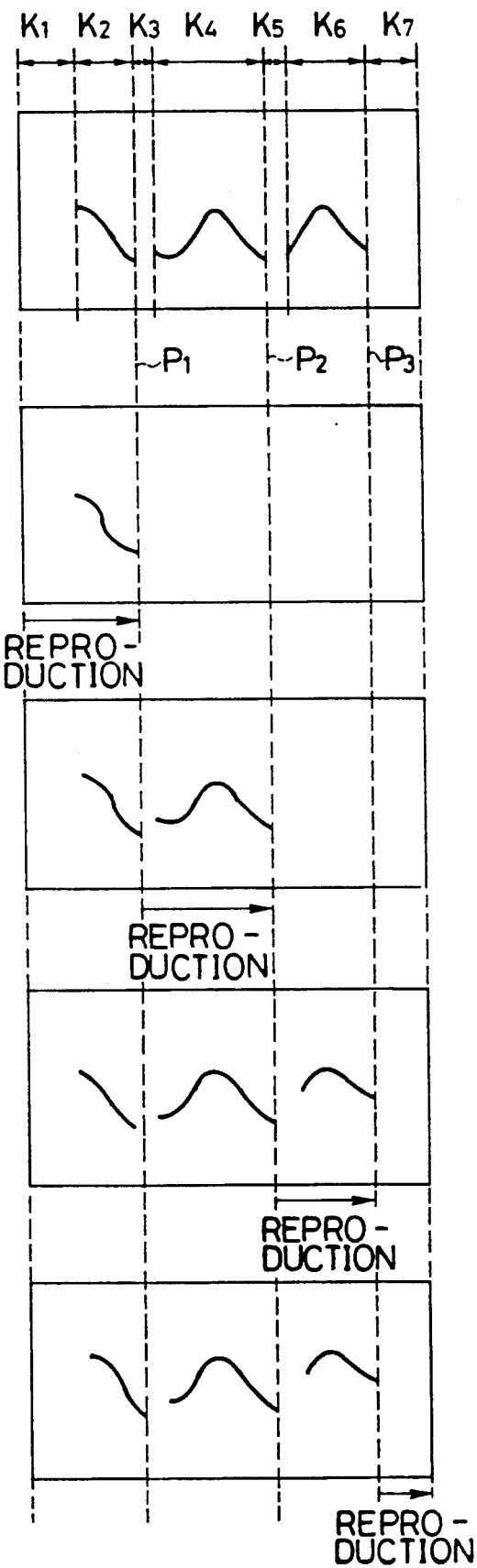
FIGS. 14(A) to 14(E) are diagrams illustrating the operation of the preferred embodiment.

An example of the intermittent reproduction operation will now be described with reference to FIG. 14. The intermittently reproducing operation is carried out for the display of intonation over sections $k_1$ to $k_7$ in FIG. 14(A). The sections $k_2$, $k_4$ and $k_6$ in which the pitch value data (i) are picked up and shown as a graph, represent those of voiced sounds close to the line spectrum structure in which a relatively stable waveform is repeated such as vowels, whereas the sections, $k_1$, $k_3$, $k_5$ and $k_7$ in which the pitch value data are not picked up, i.e., pitch value data (i) = 0 and no graph is indicated, represent silent sections or those of voiceless sounds of a continuous spectrum structure in which the waveform continues in a random fashion.

The learner must comprehend defects in his intonation by looking at FIG. 14(A), but may often find it difficult to comprehend the relationship between the content of pronunciation and the display of intonation of FIG. 14(A). In particular, a somewhat long sentence is handled to fluently pronounce the intonation. Even when the sections $k_1$ through $k_7$ are continuously reproduced, therefore, a considerable amount of drilling will be required to grasp the correlation. The intermittent reproduction operation is intended to solve such inconveniences; i.e., the display of intonation and the reproduction are forwarded intermittently such that the relationship can be easily comprehended between the content of pronunciation and the display of intonation. That is, as shown in FIG. 14(B), the intonation is displayed up to $k_1$, $k_2$ and is then reproduced. After 500 milliseconds have passed, the intonation is displayed over the sections $k_3$, $k_4$ as shown in FIG. 14(C) and is then reproduced. Similarly, hereinafter, the operation is intermittently shifted from FIG. 14(D) to FIG. 14(E), maintaining a time interval of about 500 milliseconds. The time interval of 500 milliseconds enables the learner to grasp the correspondence and to grasp the total flow of pronunciation. There arises no problem when the boundaries p1, p2, p3 of intermittent points are located at the rear part of a voiced sound as shown in FIG. 14(A). If the boundaries are brought to the front part, however, voiceless sound that often appears at the rising part of speech is in many cases not heard at the start of intermittent reproduction. That is, the data at the rising part of speech that is important for comprehending the word is missing in many cases.

Step 313 sets pitch data pointer i equal to 0, voice memory pointer v equal to 0, and a second voice memory pointer dv equal to 0. Step 314 determines whether the pitch value data (i) is a voiced sound or a silent condition or voiceless sound. A pitch value datum (i) which is greater than 0 is a voiced sound, and step 315 displays the pitch value datum (i) on the screen and the program proceeds to step 316. A pitch value datum (i) = 0 represents a silent condition or voiceless sound, and the program proceeds directly to step 316 where the voice memory pointer v used at the time of reproduction is corrected. The voice memory pointer v, however, must be incremented by $88 \times 3$, since the pitch value data are obtained by incrementing the pitch value data pointer i after every 88 locations of working memory, which is dropped to a sample frequency $\frac{1}{3}$ that of the voice memory. Step 317 detects intermittent points (p1, p2 and p3 in FIG. 14). If now the pitch value datum (i) being processed represents a voiced sound and the pitch value datum (i+1) that is increased by one represents a silent condition or voiceless sound, a determination is made that there is an intermittent point and the program proceeds to step 318. If it is not an intermittent point, however, the pitch value data must be displayed as a graph, and the program proceeds to step 321 where the pitch data value pointer i is increased. Unless the final portion i = 224 of the pitch value data is exceeded in step 322, the program returns to the step 314 via L301. When a determination is made that there is an intermittent point in step 317, the pitch value data have been displayed already up to the intermittent point and the voice is reproduced up to the intermittent point in step 318. That is, the voice data are sent to the output port 35 (OUT2) from voice data (dv) to voice data (v) of voice memory, and are converted into analog voice signals through the D-A converter 66. In this case, the output terminal PL of the output port 36 (OUT3) assumes the "H" level and the electronic switch 67 is turned on. Therefore, the analog voice signals pass through electronic switch 67, adder amplifier 26, low-pass filter 27 and power amplifier 29, and drive the speaker and the headphone via output terminals SP.OUT, PHONE1, and PHONE2. When the program first reaches step 318, the intonation of $k_1$, $k_2$ is displayed as shown in FIG. 14(B) and the position $v = p1$ is designated at $dv = 0$. Therefore, voice is reproduced for the intonation over the sections $k_1$, $k_2$. After a time interval of 500 milliseconds in step 319, step 320 sets dv equal to p1. When the program reaches step 318 via L301, the intonation of sections $k_3$ and $k_4$ is displayed as shown in FIG. 14(C), and the position $v = p2$ is designated at $dv = p1$. Therefore, voice is reproduced corresponding to the display of intonation over the sections $k_3$ and $k_4$. Similarly, intonation of the next sections $k_5$ and $k_6$ is displayed as shown in FIG. 14(D), and the position $v = p3$ is designated at $dv = p2$. Therefore, voice is reproduced corresponding to the display of intonation over the sections $k_5$ and $k_6$. Step 323 reproduces the section $k_7$ of FIG. 14(E). Here, since $dv = p3$, the speech is reproduced from voice datum (p3) through up to the final voice datum (59,531).

In surrounded portion III of FIG. 9, the content for picking up the pitch of buffer memory up to the previous time is read out again from the disc, and the intermittent reproduction operation is carried out after step 313 directly.

The pattern analyzing operation is effected in surrounded portion IV in the basic flowchart of FIG. 9, and its details are illustrated in FIG. 15.

First, as the output terminal SG of the output port 36 (OUT3) assumes the "H" level in step 400, the electronic switch 41 is turned on, whereby the output of the D-A converter 66 is input to the A-D converter 37 via high-pass filter 68, electronic switch 41, anti-aliasing filter 39, and adder amplifier 38. Step 401 sets the voice memory pointer v equal to $v_1$ and the working memory pointer w equal to 0. As explained with reference to FIG. 7, the analytical screen PT2 which represents the pattern analysis is obtained by analyzing the pattern of a range defined by the cursors 80 and 81 on the analytical screen PT1, and where the positions of cursors 80 and 81 in the voice memory are voice datum ($v_1$) and voice datum ($v_2$), respectively.

Steps 402 and 403 detect the 12-kHz outputs of the main oscillator 42 that are input to terminal $D_1$ of input port 33 (IN1), and step 404 send the voice data (v) of the voice memory to output port 35 (OUT2) such that the analog voice signals are produced from the D-A converter 66. Steps 402 to 404 work in the same manner as steps 302 to 304. The high-frequency components necessary for the pattern analysis are emphasized by the high-pass filter 68 before the analog voice signal is input to A-D converter 37, components other than the band-pass frequencies of the voice signal are removed by the anti-aliasing filter 39, and the analog voice signal is converted again into a digital voice signal by A-D converter 37. Step 405 receives the conversion data $D_2$ to $D_{13}$ and stores that data in the working memory. Steps 406 and 407 increase the working memory pointer. When the range defined by the cursors in the voice memory are not exceeded in step 408, the program returns via L400, and the conversion data $D_2$ to $D_{13}$ are written successively into the working memory.

Based on the content stored in the working memory as described above, step 409 performs a high-speed Fourier transformation to calculate a power spectrum value which is then converted into a gradation number in the light-and-shade gradation and is stored in the buffer memory. The gradation requires about seven steps, and the numerals range from 1 to 7. When the processed result is to be stored on the disk, the gradation number data is stored.

Furthermore, light-and-shade data are selected together with the gradation numbers 1 to 7 and stored in the image memory. The light-and-shade data include bit pattern segments as shown in FIG. 16 (dense portions are denoted by "H" and pale portions are denoted by "L"). The bit pattern segments of FIG. 16 are stored in the image memory in the well-known manner of a bit map memory, and a light-and-shade picture is formed such as on the analytical screen PT2.

Figure 17:
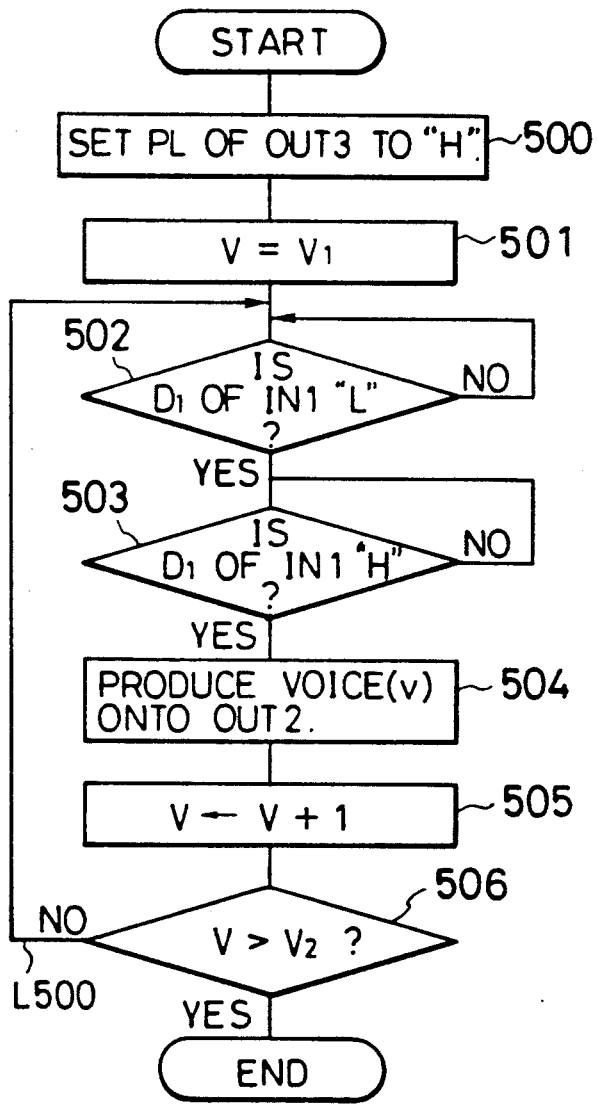

The reproducing operation is carried out according to the flowchart shown in FIG. 17.

First, as the output terminal PL of the output port 36 (OUT3) assumes the "H" level in step 500, the electronic switch 67 is turned on and the output of the D-A converter 66 is input to the power amplifier 29 via adder amplifier 26 and low-pass filter 27. As in the pattern analysis, step 501 sets the voice memory pointer v equal to $v_1$, steps 502 and 503 detect the 12-kHz output of the main oscillator 42 at terminal $D_1$ of input port 33 (IN1), step 504 sends voice datum (v) from the voice memory to the output port 35 (OUT2), and an analog voice signal is produced from the D-A converter 66. Step 505 increases the voice data pointer v. As long as the range ($v_1$ to $v_2$) of the cursors is not exceeded in the voice memory in step 506, the program returns via L500 to repeat the reproducing operation. The reproducing operation is limited between the cursors as described above, and a given section is reproduced on the recorded waveforms to comprehend the correspondence between the waveforms and the pronunciation. When the reproducing operation is carried out on PT2, which represents the pattern analysis as shown in FIG. 7, the distance $v_0 = v_2 - v_1$ between the cursors is found from the positions $v_1$ and $v_2$ of cursors 83 and 84 in the voice memory. Therefore, any section on the pattern is reproduced to grasp the correspondence between the pattern and the pronunciation.

The preferred embodiment of the invention as described above enables the voice analysis of the teacher and the learner to be displayed as a pair of screens on the display. Therefore, the teacher is permitted to readily point out any error in the pronunciation of the learner, who may easily recognize this fact. Furthermore, the teacher and the learner are allowed to efficiently select the results of voice analysis desired by themselves by depressing selected keys. Furthermore, the speech can be correctly analyzed. Moreover, use of the filter enables the speed of voice analysis to be increased compared with when a computer is used, contributing to improving the effect of drilling and decreasing the burden of the personal computer which effects the voice analysis. Also, in accordance with the preferred embodiment, the sound is automatically recorded in the voice memory in response to the rise of voice: i.e., the recording of sound never starts from the middle of an utterance. In addition, the correspondence between the display of intonation and the pronounced voice can be clearly comprehended even with a somewhat long sentence that is pronounced fluently. Finally, the magnitude of speech volume of the learner can be determined.

What is claimed is:

1. In an appartus for teaching pronunciation using recorded model voice signals produced by a teacher and comprising means for transducing voiced sounds produced by a speaker during pronunciation into training voice signals, voice analyzing means for outputting first voice data representing the results of analyzing said training voice signals output by said transducing means and second voice data representing the results of analyzing said model voice signals, a memory for storing at least said training and model voice signals and said first and second voice data and means for displaying at least said first and second voice data, the improvement wherein said apparatus further comprises a plurality of keys, each of said keys being operable by a user, and means for controlling first and second screen constitutions independently of each other on said display in response to manipulation of said keys whereby said screen constitutions display said first voice data in proximity to said second voice data, wherein said plurality of keys comprises a first set of teacher keys and a second set of learner keys, and said controlling means controls said first screen constitution in response to manipulation of said first set of keys and controls said second screen constitution in response to manipulation of said second set of keys, wherein said voice analyzing means comprising means for performing intonation or sound spectrograph analysis, and further comprising means for reading a first plurality of said voice signals stored in a voice section in said memory, means for filtering said first plurality of voice signals to form a second plurality of voice signals suited for intonation or sound spectrograph analysis, and means for writing said second plurality of voice signals into a working section in said memory, further comprising means for writing voice signals corresponding to voiced sounds of increasing amplitude in a voice rise section in said memory until said amplitude becomes greater than a predetermined value, means for writing voice signals corresponding to subsequent voiced sounds in a voice section of said memory after said amplitude becomes greater than said predetermined value, and means for transferring the voice signals written into said voice rise section to said voice section in said memory after the writing operation has been finished.

2. The apparatus for drilling pronunciation according to claim 1, wherein means for adjusting a sound-recording level are provided in a signal transmission circuit of said transducing means other than a microphone.

3. In an apparatus for teaching pronunciation using recorded model voice signals produced by a teacher and comprising means for transducing voiced sounds produced by a speaker during pronunciation into training voice signals, voice analyzing means for outputting first voice data representing the results of analyzing said training voice signals output by said transducing means and second voice data representing the results of analyzing said model voice signals, a memory for storing at least said training and model voice signals and said first and second voice data and means for displaying at least said first and second voice data, the improvement wherein said apparatus further comprises a plurality of keys, each of said keys being operable by a user, and means for controlling first and second screen constitutions independently of each other on said display in response to manipulation of said keys whereby said screen constitutions display said first voice data in proximity to said second voice data, wherein said plurality of keys comprises a first set of teacher keys and a second set of learner keys, and said controlling means controls said first screen constitution in response to manipulation of said first set of keys and controls said second screen constitution in response to manipulation of said second set of keys, and wherein all said voice data is pitch data, further comprising means for successively reading said pitch data from said voice analyzing means into a buffer section in said memory, means for displaying said pitch data on said display when said pitch data corresponds to voiced sound, and means for regenerating the voice corresponding to the pitch data of said voiced sound continuously read out when first pitch data read out is derived from a voiced sound and second pitch data read out after said first pitch data corresponds to a silent condition or a voiceless sound.

* * * * *